United States Patent
Sell

(10) Patent No.: US 10,223,295 B2
(45) Date of Patent: Mar. 5, 2019

(54) PROTECTED POINTERS

(71) Applicant: Microsoft Technology Licensing, LLC, Redmond, WA (US)

(72) Inventor: John Victor Sell, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 15/198,497

(22) Filed: Jun. 30, 2016

(65) Prior Publication Data

US 2017/0262387 A1 Sep. 14, 2017

Related U.S. Application Data

(60) Provisional application No. 62/306,490, filed on Mar. 10, 2016.

(51) Int. Cl.
*G06F 12/00* (2006.01)
*G06F 12/14* (2006.01)
(Continued)

(52) U.S. Cl.
CPC ...... *G06F 12/1483* (2013.01); *G06F 9/45558* (2013.01); *G06F 12/0864* (2013.01);
(Continued)

(58) Field of Classification Search
CPC ............. G06F 12/1483; G06F 12/0864; G06F 9/45558; G06F 2009/45583; G06F 2212/1052
See application file for complete search history.

(56) References Cited

U.S. PATENT DOCUMENTS 5,325,496 A 6/1994 Hays et al.
5,509,135 A * 4/1996 Steely, Jr. ........... G06F 12/0864
711/147
(Continued)

FOREIGN PATENT DOCUMENTS

EP 2851804 A1 3/2015

OTHER PUBLICATIONS

Nagarakatte, et al., "WatchdogLite: Hardware-Accelerated Compiler-Based Pointer Checking", CGO '14 Proceedings of Annual IEEE/ACM International Symposium on Code Generation and Optimization, Feb. 15-19, 2014, 10 pages.
(Continued)

*Primary Examiner* — Mark A Giardino, Jr.
(74) *Attorney, Agent, or Firm* — Alleman Hall Creasman & Tuttle LLP

(57) ABSTRACT

A data processing machine is configured to automatically keep track of hypervisor given pointers pointing to respective and newly allocated areas of memory and to automatically keep track of corresponding copies or derivatives of the given pointers. A unique allocation identifier is generated for each newly allocated area. The allocation identifier is appended to a valid ID's holding list. All pointers pointing to the allocated area are tracked by a protected pointers tracking table. Additionally, a multi-input associative cache stores entries for recently used ones of the protected pointers where the entries include the respective allocation identifiers of the pointers. All pointers to a given, de-allocated area can be invalidated by deleting their entries form the multi-input associative cache and by deleting the corresponding unique allocation identifier from the valid ID's holding list.

19 Claims, 8 Drawing Sheets

(51) Int. Cl.
    *G06F 9/455*     (2018.01)
    *G06F 12/0864*     (2016.01)
    *G06F 13/00*     (2006.01)
    *G06F 13/28*     (2006.01)

(52) U.S. Cl.
    CPC ............... *G06F 12/1441* (2013.01); *G06F 2009/45583* (2013.01); *G06F 2212/1052* (2013.01); *G06F 2212/152* (2013.01); *G06F 2212/6032* (2013.04)

(56) References Cited

U.S. PATENT DOCUMENTS

| | | | | |
|---|---|---|---|---|
| 5,848,435 | A * | 12/1998 | Brant | G06F 11/08 711/152 |
| 6,275,916 | B1 * | 8/2001 | Weldon, Jr. | G06F 12/023 711/129 |
| 8,631,248 | B2 | 1/2014 | Cowan et al. | |
| 8,745,741 | B1 | 6/2014 | Tice et al. | |
| 9,026,859 | B1 | 5/2015 | Pike | |
| 2007/0005815 | A1 * | 1/2007 | Boyd | G06F 3/0619 710/2 |
| 2011/0219458 | A1 | 9/2011 | Labarre et al. | |
| 2014/0020092 | A1 | 1/2014 | Davidov | |
| 2015/0089180 | A1 * | 3/2015 | Yamamura | G06F 12/1441 711/170 |
| 2015/0106588 | A1 | 4/2015 | Godard et al. | |
| 2016/0371105 | A1 * | 12/2016 | Sieffert | G06F 8/67 |

OTHER PUBLICATIONS

Wikipedia, "Intel MPX", https://en.wikipedia.org/wiki/Intel_MPX, retrieved from the Internet on Aug. 10, 2016, last modified on Jul. 25, 2016, 2 pages.

"International Search Report and Written Opinion Issued in PCT Application No. PCT/US2017/020550", dated May 31, 2017, 11 Pages.

* cited by examiner

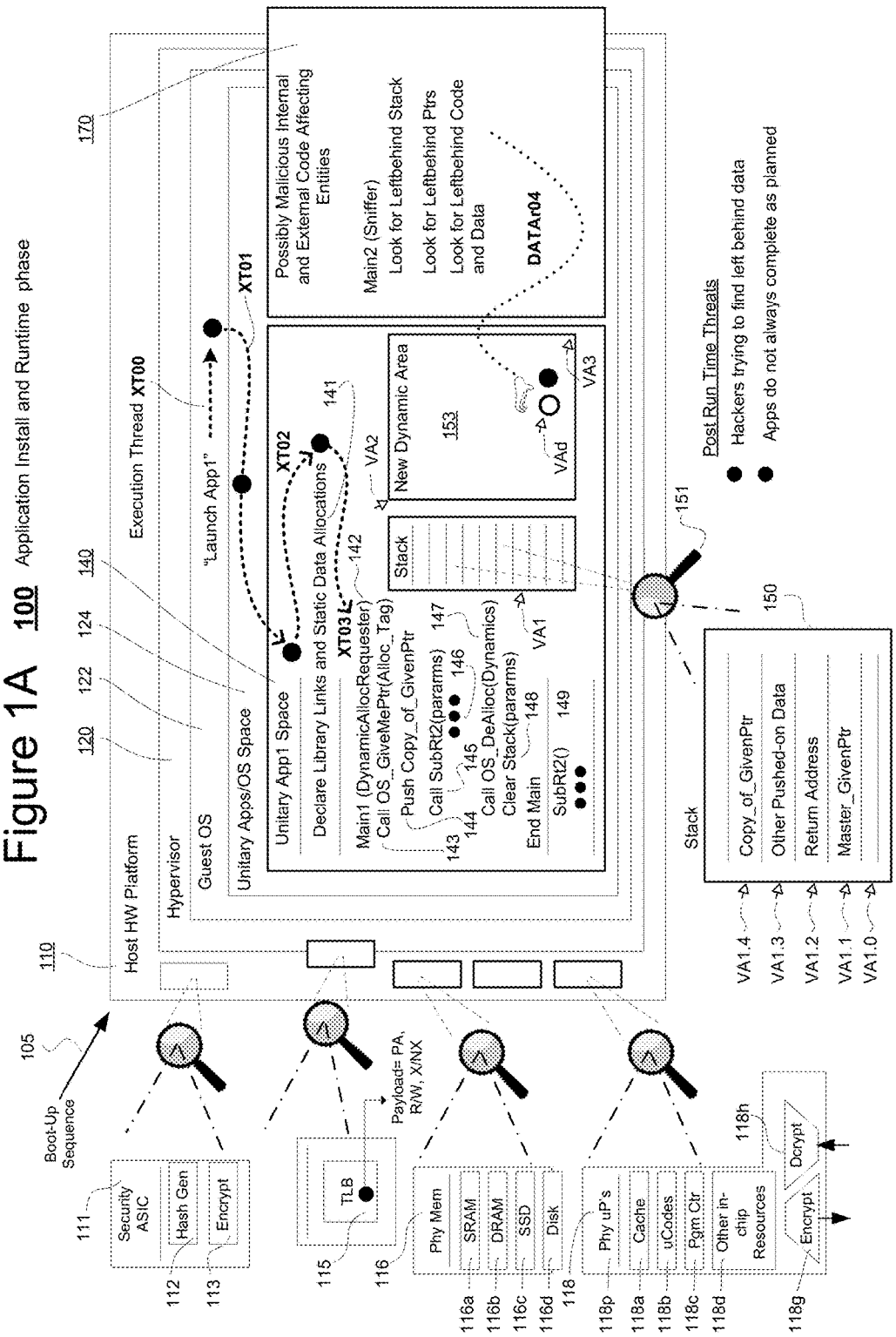

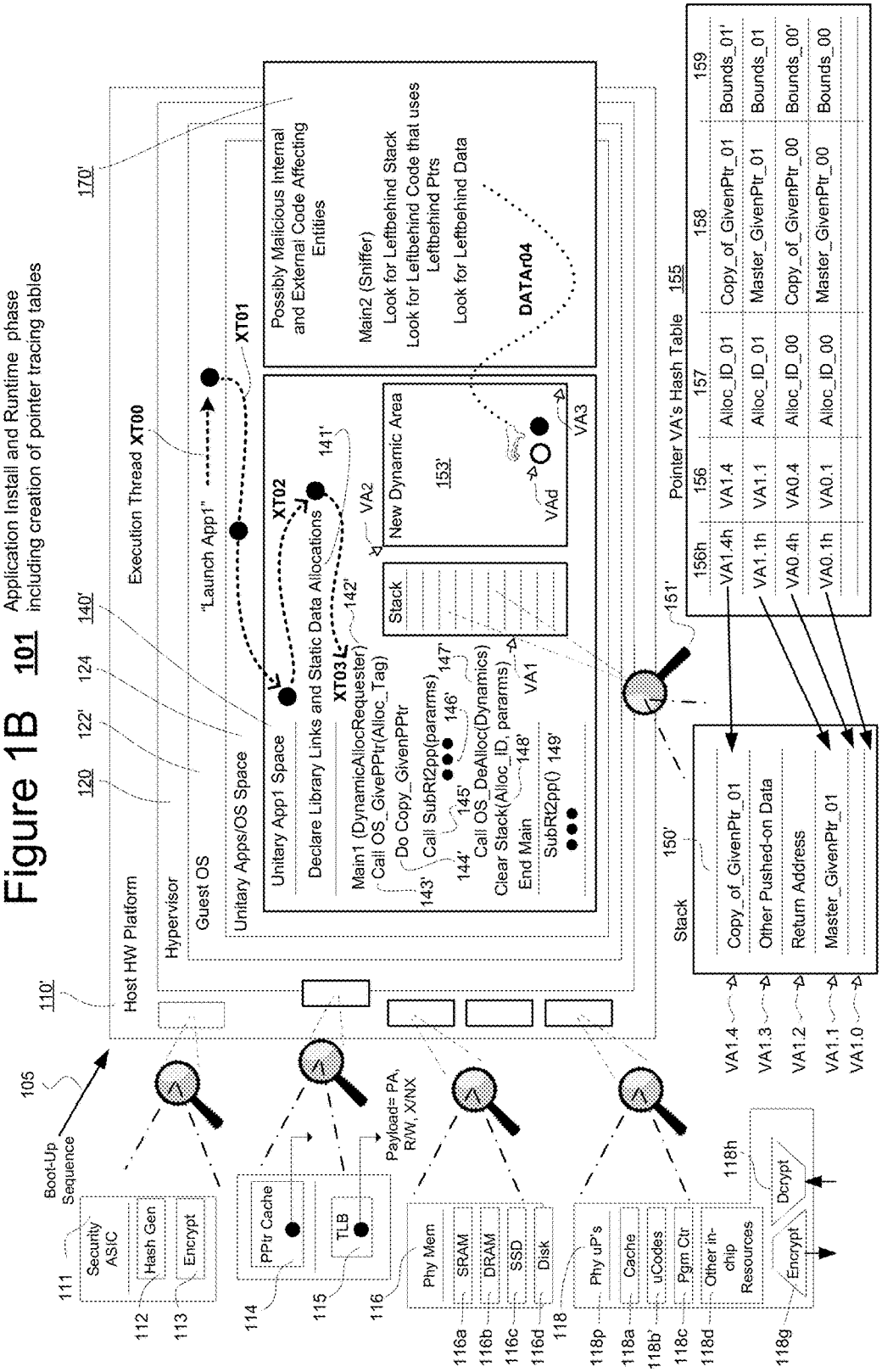

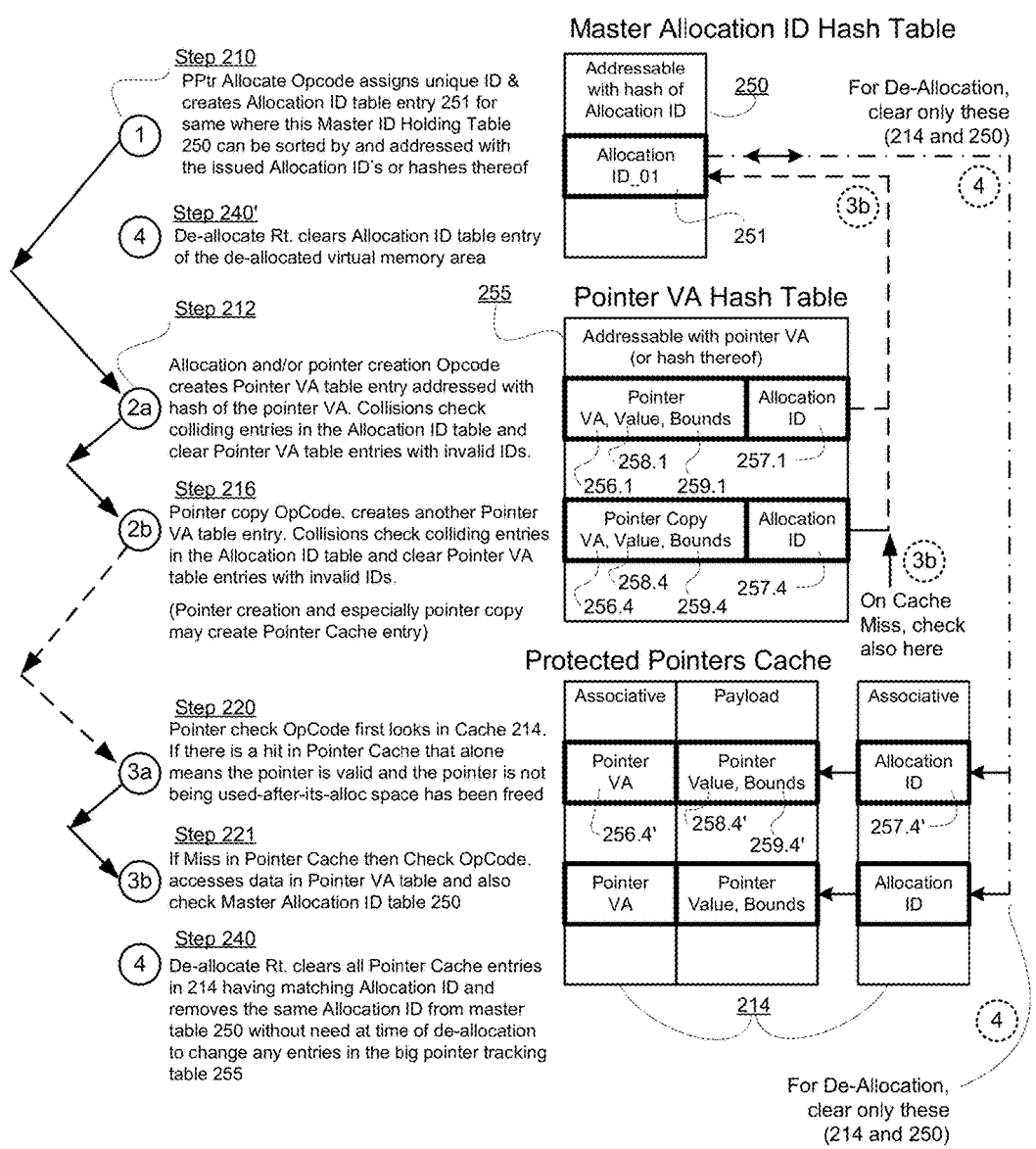

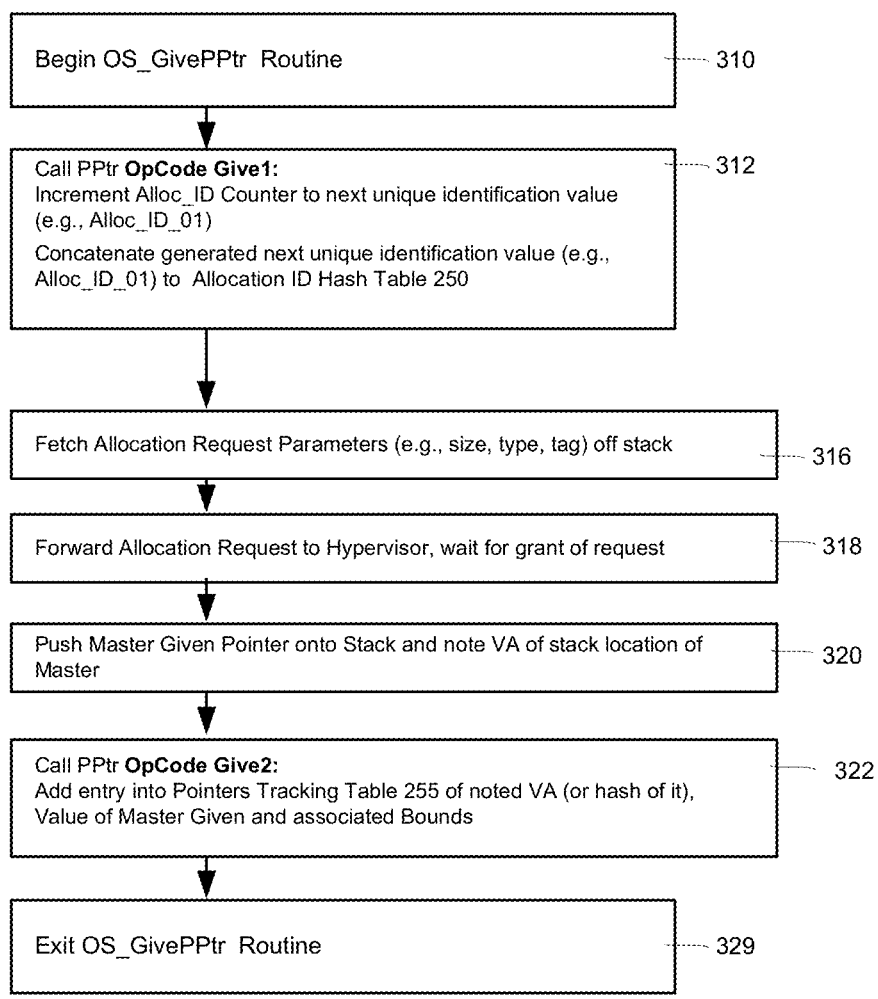

400

PROTECTED POINTERS

PRIORITY CLAIM

This application claims benefit of priority of U.S. Provisional Patent Application No. 62/306,490, filed Mar. 10, 2016, whose disclosure is incorporated herein by reference in its entirety.

BACKGROUND

Code securitization and code validation/verification for digital computer systems is becoming increasingly important due to numerous avenues available for malicious attack or inadvertent error in complex data processing systems. Examples of malicious attack include those based on infection by software viruses, worms, and Trojan horses as well as those based on loophole exploitations. Attacks can also come directly from unscrupulous but authorized users of a computer system. Attacks may attempt to modify executable program code or make use of left-behind program code and address pointers or to modify critical informational data items or inject new unauthorized program code or to gain access to key pieces of informational data that are preferably kept proprietary. Inadvertent mistakes during code development may produce similar faults and failures. Failure of applications to complete garbage collection procedures may create vulnerabilities. Measures for preventing such faults and failures are accordingly becoming increasingly important.

SUMMARY

In accordance with one nonlimiting aspect of the present disclosure, the dynamic allocation by an operating system (OS) of an area of virtual memory space to a space-requesting application program includes a returning of one or more first-instance pointers to that allocated area and a tracking of the returned pointer(s) and of copies thereof (secondary instances thereof) by use of a unique allocation identifier respectively assigned to each dynamic allocation of space (e.g., which memory space area is pointed to by way of a first-instance pointer). More specifically, each copying by the application of the values of the one or more returned pointers (first-instance pointers) is tracked in a tracking mechanism (e.g., a pointer hash table) with use of the respective unique allocation identifier so that all copies of each pointer (the first and secondary instances) can be tested for continued validity and/or boundary violations and such that all copies of each of the pointers (the first and secondary instances) can be quickly invalidated when the respective pointed-to area is de-allocated or as, or after the application program terminates. Yet more specifically, in one embodiment, the invalidation of all pointers pointing to a deallocated (freed) area of memory space comprises deleting its unique allocation identifier from a first table (an ID's holding table or list) and deleting from a high speed multi-input associative cache, all entries associated with that unique allocation identifier. The invalidation of all pointers pointing to the deallocated (freed) area does not require examination of the pointers or examination of a corresponding pointer tracking mechanism (e.g., a pointer hash table that contains information about all copies of the given pointer).

In accordance with one embodiment, new firmware opcodes are added to the opcodes palette of a data processing circuit (e.g., master microprocessor) for automatically generating the unique allocation identifier for each newly allocated area and for automatically testing for continued validity of pointers and for automatically invalidating all pointers associated with the unique allocation identifier.

In accordance with one embodiment, a multi-input associative hardware cache is included among the hardware resources palette of a data processing circuit (e.g., microprocessor) for automatically and quickly determining continued validity of pointers, for optionally fetching their boundary constraints and for allowing quick deletion from the cache of all instances of pointer values associated with a given allocation identifier. A machine-implemented method for managing pointers pointing to allocated portions of a memory space of a data processing system is provided where the method comprises: (a) associating with each of a plurality of pointers that each points to an allocated area in the memory space, a corresponding and unique allocation identifier assigned to that allocated area; (b) storing in a multi-input associative cache, associated data of at least a subset of the plurality of pointers, the stored associated data of each respective one of the at least subset of the pointers identifiably linking the respective pointer with the unique allocation identifier; and (c) using the unique allocation identifier or a hash thereof to determine if the associated data of one or more of the plurality of pointers is present in the multi-input associative cache.

This Summary is provided to introduce a selection of concepts in simplified form were the concepts and implementations thereof are further described below in the Detailed Description. This Summary is not intended to identify key features or essential features of the claimed subject matter, nor is it intended to be used to characterize or limit the scope of the claimed subject matter.

BRIEF DESCRIPTION OF THE DRAWINGS

FIG. 1A is a schematic diagram depicting an install and runtime phase of executing an application program in an allocable virtual memory space of a computing environment.

FIG. 1B is a schematic diagram provided for side-by-side comparison with FIG. 1A and for explaining how a data processing system can be modified to implement one or more a protected pointers aspects of the present disclosure.

FIG. 2 is a schematic diagram depicting three memory areas that can be created and maintained in accordance with the present disclosure for the purpose of implementing the protected pointers aspects.

FIG. 3 is a flow chart depicting a process in which the operating system (OS) requests allocation of additional virtual memory space from the Hypervisor while using one or more protected pointers aspects of the present disclosure.

DETAILED DESCRIPTION

Figure 4:
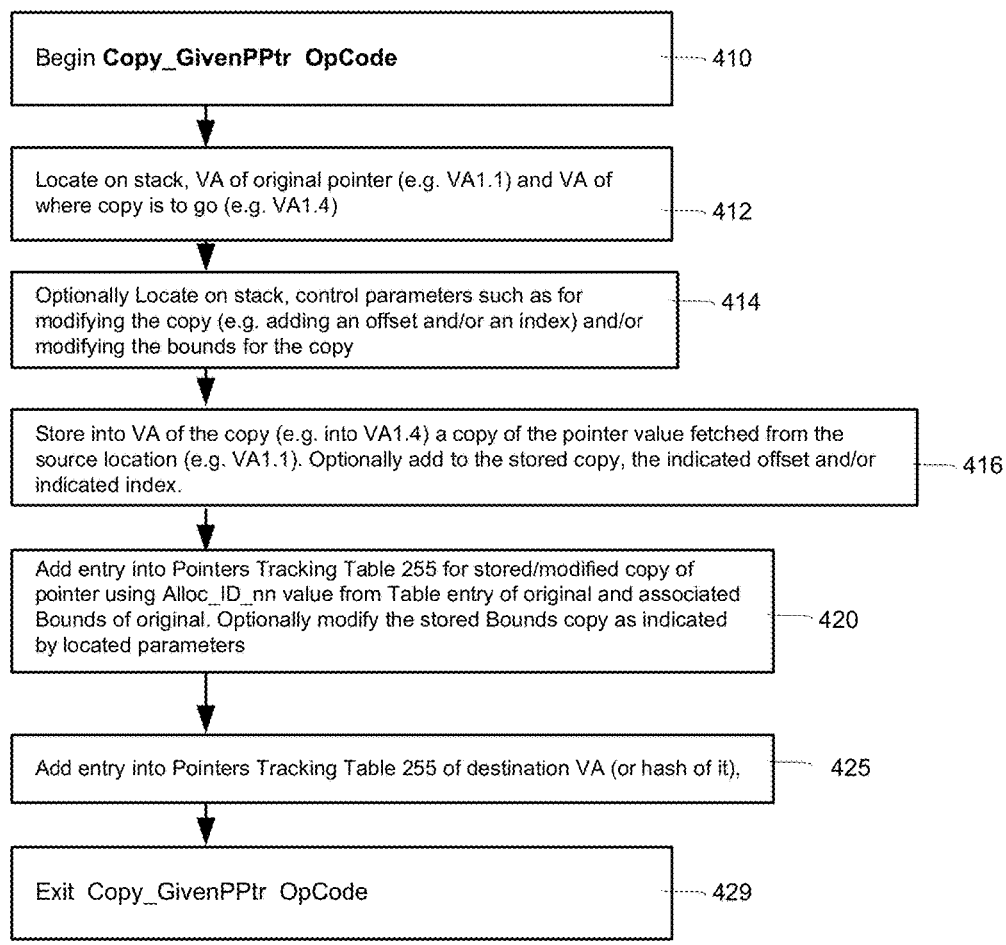
FIG. 4 is a flow chart depicting an opcode for copying protected pointers.

Various embodiments of the here disclosed technology rely on hardware and/or firmware support for code securitization and/or code validation/verification in computer or other data processing systems that might otherwise be more vulnerable to numerous kinds of malicious attacks and inadvertent design and development errors (faults). In particular, in one embodiment, additional firmware and/or hardware is added to the local resources set of a data processing machine (e.g., one including a system-on-chip (SoC)) for automatically verifying continued validity of OS allocated pointers that point to allocated portions of virtual memory space. The additional firmware and/or hardware may include new firmware opcodes added to the opcodes palette of a data processing circuit (e.g., a master processor in a local SoC). The new firmware opcodes may include a first one for automatically generating and storing a unique allocation identifier for each newly allocated area in virtual memory space (which newly allocated area is pointed to by a correspondingly newly issued pointer (first instance pointer) pointing to the area). The new firmware opcodes may further include a second one for automatically associating the unique allocation identifier of each newly allocated area and its newly issued pointer (first instance pointer) not only to that first instance but also to all copies and derivatives (secondary instance pointers) of the first instance pointer. The new firmware opcodes may yet further include a third one for automatically and quickly testing for continued validity of each of the pointers pointing to that allocated area of memory space. They may further include a fourth opcode for automatically invalidating all pointers associated with the unique allocation identifier when an allocation requesting application no longer needs the allocated area and the latter area can then be de-allocated and returned to the free space list of the operating system (OS). The additional firmware and/or hardware may include a multi-input associative cache among the hardware resources palette of a data processing circuit (e.g., SoC) where a first associative input port of the multi-input cache is usable for automatically accessing all in-cache entries associated with a given allocation identifier (e.g., for the purpose of deleting those entries) and a second associative input port is usable for quickly determining continued validity of specific pointers (e.g., where in one embodiment, validity of a specific pointer is determined simply by virtue of a cache associative hit for one or more unique attributes of that specific pointer, for example where that pointer is stored) and optionally the second associative input port is usable for fetching the respective boundary constraints of specific pointers.

It is to be understood that as used herein, the terms "hardware," "firmware" and "software" do not refer to abstractions but rather to physically real phenomenon which consume physical space and when in operational use, consume physical energy such as in the form of at least one of electrons and photons moving about to thereby define corresponding and physically real signals. Use of the term "virtual" does not detract from the physicality of the underlying phenomenon (e.g., useful machine, process, manufacture or improvement thereof) that provides the overlying virtualization. Examples of hardware include Boolean logic circuits, counters, registers, memory units that are configured to provide input/output data transformations or to store retrievable data and sequential state machines. Examples of firmware include physical signals stored in a control memory of a sequential state machine and configured to control operations of that machine. Examples of software include physical signals stored in a main memory of a data processing machine and configured to control operations of that data processing machine. Claims appended hereto which use terms such as "software", "firmware", "virtual" and the like do not preclude others from thinking about, speaking about or similarly non-usefully using abstract ideas, laws of nature or naturally occurring phenomenon. When in an active (e.g., an executing) operational mode, a "software" entity, be it an application program/thread/process, a virtual machine, an operating system (OS), a hypervisor or the alike is understood to constitute an ongoing physical process being carried out in one or more real physical machines where the machine(s) entropically consume(s) electrical power and/or other forms of real energy per unit time as a consequence of said physical ongoing processes being carried out therewithin. When in a static (e.g., non-executing) mode, an instantiated "software" entity or the alike is understood to be embodied as a substantially unique and functionally operative pattern of transformed physical matter preserved in a more than elusively transitory manner in one or more physical memory devices so that it can functionally and cooperatively interact with a software and/or firmware instructable machine as opposed to being merely descriptive and nonfunctional matter, where the one or more physical memory devices include, but not limited to, memory devices which utilize at least one of electrostatic effects, magnetic effects, phase change effects, optical effects or various combinations of these or other detectable forms of physical distinction to represent stored data.

Moreover, as used herein, the terms, "signaling", "transmitting", "informing" "indicating", "logical linking", and the like do not mean purely nonphysical and abstract events but rather physical and not elusively transitory events where the former physical events are ones whose existence can be verified by modern scientific techniques. Claims appended hereto that use the aforementioned terms, "signaling", "transmitting", "informing", "indicating", "logical linking", and the like or their equivalents do not preclude others from thinking about, speaking about or similarly using in a non-useful way abstract ideas, laws of nature or naturally occurring phenomenon.

Those skilled in the art may appreciate that the ordered sequence of terms: hardware, firmware and software indicate; based on historical development of those terms, progressively easier-to-modify sets of physically real phenomenon with hardware being ostensibly more difficult to modify (e.g., by use, historically, of a soldering iron) and with software being ostensibly easier to modify (e.g., by use, historically, of a punched hole computer cards), where firmware is ostensibly entrenched in the middle of the spectrum. With that said however, it may be appreciated that in modern complex data processing systems, the spectrum of hard to easy modification may at times be inverted depending on context, with software being the most difficult to modify without error due to its modern day complexity and hardware being easier to modify if exposed (e.g., if not securely encased in a packaging such as that used for hermetically sealing in one or more monolithically integrated circuits—a.k.a. chips).

Referring to FIG. 1A, shown is a schematic diagram depicting both a process and associated firmware/hardware resources 100 for loading, linking and launching a user application 140 and for dynamically allocating virtual memory space 153 to that application in response to a request for allocation 143 (shown as pseudocode inside block 140) that the application may send to a corresponding guest OS 122.

As used herein the term 'application' or 'application software' is to be understood as having a connotation similar to that of a software 'process' and/or a software 'thread' as executed for example within a virtualized machine environment, the latter implying that physical hardware resources are shared on a time multiplexing and context swapping basis so that it appears as if many applications, processes, threads or similarly named programmed executional sequences are operating at a same time, perhaps while being run on different virtual machines and/or while using a high speed physical memory space (e.g., SRAM, cache) of limited size on a time shared basis. The term application, application program or user application will be used herein to represent programmed executional sequences having relatively low execution and data access privileges from the point of view of the application supervising OS. The operating system (OS) and some of its predefined library processes are understood to have higher execution and data access privileges from the point of view of the OS. It is to be understood that yet higher execution and data access privileges may be accorded to so-called, Hypervisor software (HV 120 in FIG. 1A) and to data processor controlling microcode (118b) of in-SoC data processing units 118 (where SoC stands for system on a chip and where a hermetically packaged one such unit is schematically depicted at 118 in FIG. 1A). It is also to be understood that various parts of the operating system (OS) such as its library routines (to which the loaded and linked application operatively links) can be considered as applications, processes or threads executing under supervision of other parts of the OS. Some OS routines may have higher R/W (read/write) and/or X/NX (executable/not-executable) access privileges than others.

Referring still to FIG. 1A and with the above in mind, attention is now directed to the hardware resource portions of the figure. The figure shows a hardware platform 110 having various forms of system memory (e.g., main memory 116a, 116b) including extendible memory (e.g., 116c, 116d) that are configured to support a respective host Hypervisor 120 and a Guest OS 122 running under that Hypervisor. Although not shown, in some alternate embodiments there may additionally be a guest virtual machine (Guest VM) which for example is configured to execute a predetermined set of opcodes such as Java™ byte opcodes. The Hypervisor 120 can provide the operating system (OS) 122 with access to part or all of a unitary virtual memory space 124 that, in one embodiment, is shareable by all applications running under the OS 122. However, the OS 122 may elect to initially allocate to a loaded, linked, but not yet running, first application 140 only a small portion of the OS allocable memory space 124, perhaps reserving some of the unitary virtual memory space 124 for use only by privileged OS Library routines (not explicitly shown) and reserving some other portions (e.g., 153) as still 'free' space for future allocation on an as needed basis.

Launching of the application 140 causes the overlying operating system 122 to perform certain operations including, allocating static and/or dynamic areas of virtual memory for use by the launched application 140, designating one or more of the allocated areas as being privileged or not (from the OS's point of view), and attaching access permissions to the allocated areas, for example in the form of read and write permissions (data load and store permissions, also denoted as R/W permissions) and executable versus non-executable permissions (X/NX). The launching OS 122 is coupled to a Hypervisor 120 where the latter is constituted as privileged software that creates guest OS address to physical address (GpA/PA) translation tables (not shown). To be more precise, the OS 122 is responsible for generating one or more higher up hierarchical translations known as virtual address (VA) to guest 'physical' address (GpA) translation tables. GpA's are not truly physical addresses but appear to be so from the OS's point of view. The Hypervisor 120 is responsible for generating deeper stages (hierarchically lower down) translation tables known as guest 'physical' address (GpA) to real physical address translation tables. When the real physical address (PA) of a given virtual address (VA) is to be determined, a process known as walking the VA/GpA/PA hierarchical tables may be executed. However, this VA/GpA/PA tables walking operation may consume a relatively large amount of time and/or consume a significant amount of system resources. Both the Hypervisor 120 and the operating system (OS) 122 are constituted by executable code that executes within one or more master processors (e.g., core processors) provided inside the SoC 118. Although not shown, the SoC 118 may have additional, supplemental processors such as special function processors that provide high speed math calculations, video signal processing functions and so on.

In order to speed up translation of virtual addresses (VA's) into physical ones (PA's), a hardware mechanism known as a translation lookaside buffer (TLB) 115 is provided. The TLB is a form of high speed associative cache memory. More frequently needed ones of translations that have already been once determined by the VA/GpA/PA tables walking operation are cached as direct VA/PA address translations in the TLB 115 together with corresponding R/W and X/NX permissions provided by the OS 122 and/or by the Hypervisor 120. In one embodiment, it is the maximally restrictive ones of the union of the OS and Hypervisor R/W and X/NX permissions (R/W, X/NX Maxed R Permissions) that are cached in the TLB. If an immediately needed VA/PA translation is not found to already be cached in the TLB then the hypervisor 120 is called on to perform the slower walk-through and search through multi-level VA/GpA/PA translation tables (not shown) looking for the combinations that provides the needed VA/PA translation. In one embodiment, the output PA's are each the address of a 4 Kbyte page of memory rather than one for a specifically needed item of code or informational data and an offset (and optional index) is added to the physical page address (PpgA) to access the desired item of code or data. The output of the TLB hardware 115 is known as a TLB payload. Physical addresses and corresponding read/write signals generated in response to either the output of the TLB 115 or that of the hypervisor 120 are supplied either to a high-speed memory cache (e.g., SRAM) 118a disposed within a monolithically integrated circuit packaging 118 housing a so-called system on a chip (SoC) or to an off-chip main memory 116, where the latter main memory is normally implemented as DRAM (Dynamic Random Access Memory, 116b) but may also include SRAM (Static Random Access Memory 116a) and nonvolatile flash memory (116c). Data stored within the SoC package 118 is typically stored in non-encrypted form (plaintext form). Data stored in slower memory 116 such as off-chip disk memory (e.g., magnetic 116d or SSD 116c) may be stored in encrypted form. Appropriate decryption and re-encryption hardware mechanisms (118h, 118g) may be used for converting stored data from encrypted form to plaintext form on an as needed basis. Code and data that are frequently used for current operations are swapped into the in-chip cache 118a under supervision of the Hypervisor 120. Code and data that are no longer frequently needed for current operations are swapped out of the in-chip cache 118a and stored in slower off-chip memory space (e.g., 116b, 116d). The hypervisor 120 automatically takes care of the bookkeeping regarding which chunk of data (e.g., 4 Kbyte page) is stored in cache 118a or main memory 116a/116b or in a slower/bigger form of memory such as magnetic disk 116d or solid state disk (SSD 116c). One or both of the Hypervisor (HV) and the operating system (OS) may automatically take care of the bookkeeping regarding which chunks of on-disk data are stored as encrypted data and which are stored as plaintext data.

In addition to its on-board cache memory 118a, the SoC package 118 houses one or more data processing units, such as microprocessor cores which are here collectively denoted as master uP's 118p. It is to be understood that SoC package 118 may include special memory units 118b used for storing microcode that is being executed by the in-chip master data processing units (uP's) 118p when carrying out respective op code operations. The one or more special memory units are not accessible by executing user software (e.g., application 140) or even by the platform hosted operating system 122. As those skilled in the art will appreciate, compiled user software (e.g., application 140) typically causes op-codes and/or opcode-targeted data to be supplied to the in-SoC uP's 118p and then the uP's utilize the microcode that is only accessible to them to operate on the register data and/or main memory data. In one embodiment, uP used registers are each 64 bits wide. In one embodiment, only a lower 48 of those bits are used for physical addressing while the upper 16 bits may be used for other functions. In one embodiment, the registers of the in-SoC uP's 118p include a program counter 118c, an accumulator, a top of stack pointer, a base address providing register, and offset providing register and so on (where the latter registers are cumulatively represented as 118d). Typically, in a virtualized machine environment, the OS 122 and the user application 140 will not try to directly access the base hardware registers (e.g., physical program counter, physical top of stack pointer, etc.) although they could (except for a few registers reserved for access only by the Hypervisor 120). Instead they will more typically use virtualized machine resources provided on a time multiplexed basis by the Hypervisor 120.

In addition to the illustrated in-SoC master data processing units (uP's) 118p, the application hosting platform 110 may include one or more specialty data processing units (not shown) that may be external to and/or inside the SoC packaging 118 and that provide specialty functions such as video or other graphic data processing (e.g., GPU's), audio data processing, high speed parallel math processing (MPU's) such as 3D vector processing, memory management processing (MMU's) and so forth. The supplemental data processing units may be operatively coupled to the master uP's 118p. The main memory 116a/116b and/or to the slower/bigger memory units 116c/116d and may be commanded by the operating system 122 or by the application program 140 to perform various data load and data store operations for predetermined areas in the corresponding memory units 116a/116b and/or 116c/116d. In accordance with one aspect of the present disclosure, supplemental data processing devices such as the specialty data processing units (not shown) may be treated in one context as if they were merely memory accessing application programs, processes, threads or the like and thus the specialty data processing units (not shown) may issue requests for and be granted table entries for returned pointers (Ptr's) to corresponding dynamically allocated memory areas in a fashion similar to how applications may issue requests for and be granted table entries for issued pointers (e.g., protected pointers or PPtr's per the present disclosure) and corresponding dynamically allocated memory areas.

As indicated in a pseudo source coded portion of FIG. 1A (e.g., 141), initial pre-process coding (source level coding) of the exemplary application program 140 is subdivided into a number of software sections including a pre-process declarations section 141, a main or top level program section 142 and one or more subsidiary program or subroutines 149 sections. For sake of illustrative example, the main program section 142 is shown to include a first instruction 143 (a pseudocode instruction) directed to the operating system (OS) and requesting dynamic allocation of more portions of virtual memory space to it even though the pre-process declarations section 141 had already obtained a respective amount of static allocation (e.g., for storing static executable code and/or static informational data items including static resolved links for example to various OS Library routines).

The main program section 142 is shown to further include a second instruction 144 pushing a copy of a pointer (GivenPointer or first instance pointer) given to it by the OS onto a stack (150, which stack is located inside a unitary virtual memory space 124) and a third instruction 145 calling on a subroutine (e.g., SubRt2( )) which will be using the pushed copy of the pointer (a secondary instance pointer) to access executable code and/or informational data items within a newly allocated area 153 of virtual memory space (inside the unitary virtual memory space 124) that was allocated by the OS 122 in response to the dynamic allocation request of the first instruction 143.

Magnification 151 shows a portion of the stack 150 in more detail. In the magnified view, white filled arrows point to respective starting locations (virtual addresses or VA's for short) of data items that extend from those starting locations to appropriate ending locations (not shown) depending on the data typing of the respective data items. A first virtual address VA1.0 is where the top-of-stack register (a virtual stack pointer register used by the application 141, which virtual stack pointer is not explicitly shown) pointed to before execution of the allocation requesting first instruction 143. At a higher up virtual address VA1.1 there is contained a code value logically denoted as Master_GivenPtr (also referred to here as a first instance pointer) and whose value represents a second virtual address VA2, which latter virtual addresses is the start location of the newly allocated area 153. A third virtual address VA3 is where the newly allocated area 153 ends. Although not shown, the third virtual address VA3 may also be stored on the stack 150 near to the location of the OS-generated Master_GivenPtr. (As will become apparent in the below, so-called, de-referencing accesses to specific executable code and/or informational data items within the newly and dynamically allocated area 153 should remain between the bounds established by the second and third virtual addresses VA2 and VA3.)

Above virtual address position VA1.1 and within the stack 150 there is contained a code value logically denoted as Return Address placed at stack location VA1.2 and pointing to another virtual address (e.g., the start of further instructions 146), which is a location within the initially allocated space of application 141 where executional control is to be returned to after subroutine SubRt2 (149) finishes executing. Yet other pushed-onto-stack data may reside at the location starting with VA1.3 of the stack 150. In this example, the calling main routine 142 has pushed a "copy" (also referred to here as a secondary instance pointer) of the Master_GivenPtr (the one stored at VA1.1) into location VA1.4 of the stack 150 with the understanding that the called subroutine (SubRt2 149) will use that stored value (Copy_of_GivenPtr) pursuant to a predetermined protocol to reference the start VA2 of the newly allocated area 153 and will then typically add an offset address amount and an index value to the start value VA2 to access a specific piece of executable code or informational data item inside newly allocated area 153. Although the entry at location VA1.4 is denoted as a "copy" of the Master_GivenPtr, it is to be understood that at its discretion, the application 140 (at instruction 144) may have used a value for the secondary instance pointer that is slightly offset from the original Master_GivenPtr. Typically, good programming practice calls for using an exact copy of the Master_GivenPtr, but this does not necessarily always happen. The here disclosed protected pointers (PPtr's) scheme is operative even when not-exactly the same "copies" of the Master_GivenPtr are pushed on the stack where the not-exactly same "copies" are derived from the Master_GivenPtr and basically point to the same allocated memory area 153 but by, for example, adding at least one of a predetermined offset and index to the value of the Master_GivenPtr.

As those skilled in the art may appreciate, one reason why pursuant to good programming practice the main routine 142 pushes a "copy" (Copy_of_GivenPtr) of the Master_GivenPtr (the one stored at VA1.1) into location VA1.4 of the stack 150 rather than moving the original Master_GivenPtr (the first instance pointer) to location VA1.4 is because subroutine call operations and corresponding return operations typically overwrite their portions of the stack for example with returned data and thus the Master_GivenPtr (the one stored at VA1.1) might be undesirably destroyed if it were moved rather than copied into stack location VA1.4. Although the illustrated example shows the creation of just one copy (Copy_of_GivenPtr at VA1.4) on the stack, in practice many such copies (e.g., dozens or hundreds) are typically pushed onto the stack as one subroutine calls the next and so on. Accordingly, for a given hierarchy of plural subroutine calls (one calling the next) there can be many copies (secondary instance pointers) derived from the Master_GivenPtr (the one stored at VA1.1) and also stored on the stack at various points in time and at respective locations up and down the stack 150.

Since it is known among hackers that applications often push many copies of a master pointer onto the stack, various forms of hacking code (e.g., Trojan horse code, sniffer code) 170 may come to be lodged in the system. Because the hacking code can be cognizant of the fact that multiple copies of one or more Master_GivenPtr's (e.g., the one stored at VA1.1) might be created in a stack area (e.g., 150), such hacking code 170, also referred to here as sniffer code 170; may go about sniffing for an on-stack repeat pattern of such copies (e.g., Copy_of_GivenPtr at VA1.4) for the purpose of using the code value of the Master_GivenPtr or its derived "copies" to thereby locate the newly allocated area 153 and to then go sniffing about in there (on a "fishing expedition") looking for proprietary pieces of code and associated data, for example for code that will enable unearthing of a user's password stored at location VAd.

The unitary App's/OS space of the system is typically astronomically large (e.g., 2 to the 64th power number of bytes) and hence the sniffer code 170 is unlikely to find what it is looking for based merely on random guesses of where to start looking. However, the probability of success for the sniffer code 170 can greatly increase if the sniffer code 170 locates left behind but usable, executable code that itself references to a previously valid pointer value (e.g., Copy_of_GivenPtr at VA1.4) or calls another routine that references the previously valid pointer value and the sniffer code 170 then uses one or more of those codes (e.g., routines that call deeper subroutines) to carry out a function that is dependent on use of left behind pointers and can aid the sniffer code 170 with its fishing expeditions. Hence, it is desirable to minimize the temporal extent within which left behind but usable, executable code (code that should be limited to accessing only pointer values pointing to still allocated areas) can be employed to aid the sniffer code 170 with its fishing expeditions. (More specifically, if one or more of the to-be-used pointers are beforehand "invalidated", then the left behind executable code should fail/halt when checking on the validity of the beforehand invalidated pointer(s) and the sniffer code 170 will fail with this aspect of its fishing expeditions. A problem addressed here is how to efficiently, quickly and assuredly "invalidate" all first and secondary instance pointers that point to a deallocated area of memory space.)

With the above in mind, well written/well behaved applications (e.g., 140) typically include code (e.g., instructions 147 and 148) for a graceful departure from virtual memory space 124 when the application is finished using its allocated spaces (e.g., 153). One such instruction 147 may pass to the operating system (OS) 122 an identifier (e.g., VA2, VA3) of a dynamically allocated area (e.g., 153) and ask the OS to de-allocate that area of memory space. In other words, re-designate it as again belonging to free space. Another such instruction 148 may clear parts of the stack 150 (e.g., VA1.1 through VA1.4) that the application knows it used when asking for and using the dynamically allocated areas (e.g., 153). Thus the Master_Given pointers (like the one stored at VA1.1) and copies thereof (secondary instance pointers) should be erased from the stack (or elsewhere) and no longer left behind for sniffing out by hacker code such as that represented at 170. Finally, after the application 140 is finished cleaning out all the allocated virtual memory space it is responsible for having created for itself, the terminating the application 140 may ask the OS to free up (de-allocate and return to a free space list) the statically allocated memory area 140 that the OS created in response to a pre-process allocation directive such as that of exemplary instruction 141. At that point, the well behaved application 140 should have cleaned up behind it all the footprints that might be otherwise exploited by hacker code (e.g., 170).

Despite the best of intentions however, and merely as one example, unexpected terminations may occur for a given application (e.g., 140) before it gets to execute its graceful termination code (e.g., 147, 148) and to clear out all of its footprints. For example, during execution of intermediate code represented by ellipses 146, the application may encounter an unexpected error condition for which the programmers of the application forgot to include a graceful exit or for which the operating system (OS) and/or system hardware and/or firmware (e.g., 118b) forces an ungraceful exit. In that case one or more pointers pointing to the dynamically allocated areas (e.g., 153) requested by the application may be left behind in virtual memory space, more specifically left behind in one or more of correspondingly utilized areas (e.g., VA1.1.-VA1.4) of the stack that include first and/or secondary instance pointers and these stack locations or executable code that re-uses these stack locations may be exploited by a hacker's sniffing code 170. In the given example at 170, the sniffer code (the application named Main2) may look for data patterns in the unitary, and thus universally reachable virtual memory space 124 that indicate the area had been used as a stack 150 by a respective application (e.g., 140). For example, there may be telltale calls to certain OS Library routines that are known to be made by certain types of applications (e.g., web browsers). Once the stack is found, the sniffer 170 can start walking up and down the stack looking for a master pointer (in location VA1.1) and a same-valued copy (in location VA1.4) of the pointer where both point to a dynamically allocated area 153 created on behalf of an ungracefully terminated application program. Once that associated area (e.g., 153) is found, it can be walked through looking for known patterns indicative of executable code and/or informational data items (e.g., user passwords) that the sniffer 170 can grab a copy of (represented by data grab operation DATAr04) and can transmit back to a remote location (e.g., a networked server). At that point, various security measures may be breached where, as seen in the above, the breach started with a failure of the system to deactivate all pointers and copies thereof (first and secondary instance pointers) that point to dynamically allocated areas (e.g., 153). It is to be understood that the above is merely an example and many other pathways are available for exploitation of pointers that have not been properly invalidated or erased or overwritten. Another possible example is that of a first program making calls that cause space to be allocated and later deallocated, but because of errors in the OS (e.g., OS library functions), the hypervisor and/or other applications or subroutines, the given pointers (and/or copies, derivatives thereof) are not all cleaned up completely, and a subsequent call by the hacker code can result in an old pointer (one that should have been cleaned up) being used for improper purposes.

Although FIG. 1A shows the creation of just one Master_Given pointer (like the one stored at VA1.1) and just one copy (like the one stored at VA1.4), more typically during execution of complex application programs, creation and copying of master pointers may occur hundreds or thousands of times as requests are made for dynamically allocated areas (e.g., 153) and as references to the dynamically allocated areas (e.g., 153) are stored in various portions of virtual memory space and where, for one reason or another the corresponding pointers (e.g., those at stack locations VA1.1 and VA1.4) are not appropriately invalidated, deactivated or erased. When a non-graceful application termination takes place, it becomes very difficult to locate all the OS given pointers (e.g., Master_GivenPtr stored in VA1.1) and all the application generated copies thereof (e.g., Copy_of_GivenPtr stored in VA1.4) and derivatives thereof (e.g., sum of the GivenPtr and an offset or index) and to at least invalidate them if not erasing them all from memory before a sniffer program such as 170 has a chance to sniff them out and use them. This especially true for an OS that is managing dozens or more of applications and/or speculative pre-commit threads thereof where each may be repeatedly requesting dynamic allocation of virtual memory areas for itself. In the below, an automated method is disclosed that helps to automatically keep track of generated OS given pointers (e.g., Master_GivenPtr stored in VA1.1) and all the application generated copies thereof (e.g., Copy_of_GivenPtr stored in VA1.4) and derivatives thereof so they can all be easily and quickly invalidated by the OS even in cases of non-graceful application termination and also such that the continued validity of application generated copies/derivatives can be rapidly tested for during execution of the application.

Before delving into the details of such a method, a detour is taken here to explain the environment in which this can take place.

Taken at a higher level of overview, FIG. 1A depicts part of a modern software development and execution environment 100 for developing (coding, testing, modifying and re-testing) an application program (e.g., 140) and thereafter executing it in the field (outside the development laboratory) on a hardware platform based for example on a x86, ARM, or another such architecture and that provides one or more relatively sophisticated data processing units (e.g., master CPU's, multi-cores, microcontrollers, GPU's, system-on-chip SoC units) as well as associated levels of memory (e.g., cache, SRAM, DRAM, Solid State Disk—SSD) and associated network communication capabilities (e.g., Ethernet, USB, Firewire, WiFi, etc.). Various trivial support structures such as power supplies, cables, connectors, wireless transceivers and so on may be present but are not shown in FIG. 1A to avoid unnecessary clutter as such are well understood by those skilled in the relevant arts.

A power-up or boot-up procedure will now be described from a security point of view and still with reference to FIG. 1A. Diagonal arrow symbol 105 indicates the preferred sequence of boot and activation. First the hardware platform 110 is started up in a self validating mode. This process may include execution of a basic system integrity check (BIOS) which validates the operability of onboard hardware resources such as physical memory units 116 (external-of SoC memory units) and physical data processing units such as 118*p* (e.g., internal within SoC processing units) as well as physical communication resources such as networking input/output units 160. Early in the self validating boot up (105) of the hardware platform 110, an onboard security processor 111 is activated to validate firmware (e.g., microcodes 118*b*, encrypt/decrypt functions 118*g*/118*h*) inside various hardware units of the platform including inside its data processing units 118*p* and its communication units 160. Included in this self validating process is the confirmation of software inside the installed hypervisor unit 120 of the platform 110 and confirmation of microcodes 118*b* provided for example inside the hermetically sealed packaging(s) 118 of the on-board data processing units 118*p*. The confirmed microcodes may alternatively or additionally be stored inside special, 'buried' metadata memory space regions of system memory where the 'buried' memory space regions are not ordinarily accessible to user software or even to the guest operating system (OS) 122. As those skilled in the art will appreciate, the hypervisor unit 120 is used for virtualizing one or more operations of the system. The security processor 111 uses a built in and software-inaccessible Hash generator 112 to form Hash sequences from code streams present inside the being-validated units (e.g., 114, 118, 160). These Hash sequences are automatically encrypted by an in-chip encryptor 113 and automatically transmitted to an external validation unit (not shown) that automatically returns digitally signed certificates validating (attesting to) the trustworthiness of the units tested by the security processor 111. One form of such trust confirmation is known as remote attestation. In the illustrated embodiment, the on-board data processing units 118*p* have their own encryption and decryption hardware and/or firmware 118*g*/118*h* for keeping secure any plaintext code held in the on-chip cache memory 118*a* or in the on-chip microcode storing area 118*b* and/or in other on-chip resources 118*d* where the thus-encapsulated (contained inside the chip) code is always re-encrypted (118*g*) before being swapped out to less encapsulated storage units 116. In one embodiment, the on-chip microcode 118*b* can control the allocation of privileges for accessing other in-chip data including that in the cache 118*a* and that in the other on-chip resources 118*d*. In one embodiment, the on-chip microcode 118*b* may be modified to support one or more aspects of a protected pointers (PPtr's) scheme disclosed herein. More specifically, in one embodiment, the functions of new opcodes that assign unique allocation IDs and append them to a master ID's holding table (e.g., 250), that enter new pointers into a pointers tracking table (e.g., 255), that maintain entries of a multi-input associative cache (e.g., 214) and that handle the invaliding of a given allocation ID and all its protected pointers, are implemented predominantly with high speed hardware rather than with slower speed microcode or yet slower speed general software (e.g., assembly language level). On the other hand, the initial setting up of the special tables (e.g., 250, 255) can be carried out with slower speed microcode/firmware or yet slower speed general software.

For sake of completeness, a more detailed description is now provided of some further components inside the discussed hardware platform units 114, 116 and 118. The physical data processing units 118*p*; which could be core processors of a multi-core system-on-a-chip (SoC) or other such master processor(s) on which the Hypervisor 120 and operating system (OS) 122 execute will typically each include one or more physical program counters such as 118*c* and other physical registers. Each time the Hypervisor 120 allocates the physical data processing units 118*p* for use by different ones of virtualized actors (e.g., applications, processes, threads), the Hypervisor 120 will automatically first save the so-called physical and virtual processor contexts (e.g., program count and other register contents) of the control-relinquishing actor and install the pre-saved context of the control taking-over actor. Each of the data processors 118*p* has direct access to a cache memory 118*a*, where as those skilled in the art will appreciate, the cache memory may be subdivided into portions of increasing capacity but decreasing speed such as L1, L2 and L3. The L3 level may be in common communication with all the processors 118*p*. The cache memory 118*a* is also in operative communication with supplementary memory such off-chip static random access memory (SRAM) 116*a*, dynamic memory (DRAM) 116*b* and generally offboard disk memory 116*d* and solid state disk memory (SSD) 116*c*. As of those skilled in the art will appreciate, data is repeatedly swapped between the cache memory 118*a* and the other physical memory units 116 on an as-needed basis with or without encryption depending on tradeoffs between speed and security needs. A mostly hardware-implemented unit known as a translation lookaside buffer (TLB) 115 is used to cache frequently used translations between virtual addresses (VA's) and physical addresses (PA's). In one embodiment, the TLB 115 may use a set associative form of content addressable memory (CAM) for providing its translation services. In some embodiments, a service request to the TLB 115 (a set associative lookup request) causes the TLB 115 to output a payload signal containing a physical address (PA), a read or write permission (R/W) and an execute/don't execute permission (X/NX).

Continuing with the description of the self-securitizing boot up sequence 105, after the trustworthiness of the host hardware platform 110 and Hypervisor 120 have been validated, the guest operating system 122 is installed, optionally validated in a similar manner (e.g., using code hashing and digital certification) and it is thereafter activated. In an alternate embodiment (not shown) a guest virtual machine (VM) is installed, validated and activated under the auspices of the guest operating system 122. The latter option may be used in conjunction for example with Java™ bytecode compliant software.

Finally, an application load, link and launch command signal ("Launch APP1") is passed into the guest OS 122, causing the latter operating system to allocate an appropriately sized part (e.g., 140) of a unitary virtual memory space 124 into which static code and static informational data items of the application 140 are loaded. As used here, the loaded application program 140 is understood to be in executable, virtual object code format such that it can be directly executed by the guest OS 122 in cooperation with the Hypervisor 120 and the supporting hardware platform 110. Depiction of the application program 140 in source code format within FIG. 1A is for the sake of simplified explanation.

Execution of the launched application 140 may be described in terms of execution threads (XT's) snaking their way through the allocated virtual memory space 124 using one or more corresponding, virtual program counters. The executable thread that launches the application program is denoted as XT01 and it executes inside the OS 122. The application is understood to be pre-compiled and linked to declared library routines or other library services. As already mentioned, a typical first section 141 in most application files includes so-called pre-process declarations for library links and declarations for static space allocations and data typings (which a link-loader part of the OS allocates and assigns types to). As part of the launch sequence, an executed initialization thread XT02 identifies virtual memory space that will be consumed by initially loaded executable code (where executable code points are represented by solid black circles in FIG. 1A) and also virtual memory space that will be consumed by statically created informational data items (represented by white filled circles in FIG. 1A). A next execution thread XT03 initiates the main program section 142. Typically, the main program section 142 includes a closed loop of subroutine calls (e.g., 145) where one of those main section subroutines is a contingently executed, graceful termination routine (e.g., which executes in response to detection of an irreconcilable error and has instructions 147 and 148). However, for purpose of illustration, the exemplary first instruction 143 is depicted as a dynamic memory allocation request instruction (e.g., "OS_GiveMePtr(Alloc_Tag, Other Params)") whereby the executing application 140 (a.k.a. App1) asks the OS 122 to give it some more virtual memory space (e.g., 153) and in doing so, the application passes various parameters to the OS indicating the size of the memory space area being requested, and optionally the types of data structures that may be present in the allocated virtual memory area and so forth. Optionally, the requesting application (App1) may associate a short length pointer tag (e.g., Alloc_Tag) with the substantially longer pointer value (e.g., a 64 bit long Master_GivenPtr stored in VA1.1) that the OS will return to the application, for example inside the application's stack 150 in accordance with a predefined protocol for the OS and for the called OS_GiveMePtr( ) library routine. The protocol establishes where (e.g., VA.1.1) on the return stack the OS will place the requested, start of allocated area pointer (a.k.a. first instance pointer). Although not shown in FIG. 1A for the sake of simplicity, the on-stack returned data of the called OS_GiveMePtr( ) library routine might also include the terminal address (e.g., VA3) for the allocated space and/or a length indicator for the allocated area and/or other informational data items of relevance (e.g., data typings, read/write permissions, executable/nonexecutable code permissions and locations of each in the allocated virtual memory area, for example inside 153). In one embodiment, when the application calls to the OS to allocate the additional space, as part of performing the requested service (e.g., OS_GiveMePtr(Alloc_Tag, Other Params), the OS executes a hardware implemented opcode instruction that creates the corresponding new unique ID and appends the new unique ID onto the master ID's holding table (e.g., 250 of FIG. 2). The OS also remembers the new ID so that when the space is later de-allocated, the OS executes yet another hardware implemented opcode instruction while passing the remembered ID to that opcode and the actuated opcode then invalidates the ID (e.g., by removing the ID from the master ID's holding table and by also removing all protected pointers associated with that ID from the multi-input associative cache (e.g., 214 of FIG. 2)).

Prior to a subsequent subroutine call 145 that will use the dynamically allocated new area 153, the application uses an instruction such as 144 to push a copy (a secondary instance) of the OS given pointer (e.g., the 64 bit long Master_GivenPtr stored in VA1.1) into a protocol-determined relative location (e.g., VA1.4) of the stack 150. Then the main section of the application passes execution control to another area 149 in the unitary memory space 124 where the called subroutine SubRt2 resides. The called subroutine SubRt2 then accesses the shared stack 150 to pick up the saved pointer copy (e.g., to pop it off the stack) and uses it along with other optionally passed data (e.g., stored at stack location VA1.3) for accessing one or more specific items of data (e.g., that stored at location VAd) for example by adding an offset and an index to the base value stored at stack location VA1.4 (e.g., VAd=Copy_of_GivenPtr+Offset+Index). Upon completion of its tasks, subroutine SubRt2 uses the Return Address saved at stack location VA1.2 to return control back to a next instruction 146 following the call instruction of location 145.

As mentioned above, either during execution of application 140 (a.k.a. App1) or subsequent to execution of steps 147-148 or subsequent to an ungraceful termination of application 140, another application 170 that has launched at least partly inside the unitary virtual memory space 124 of the OS 122 may start sniffing through the stack 150 looking for predetermined signature patterns. If it finds a signature indicative of the presence of a left behind stack with pointers on it (e.g., the pointer at stack location VA1.1 and/or the other one at stack location VA1.4), the sniffer application 170 may try to use the found pointer(s) to locate an exploitable piece of executable code and/or informational data item inside dynamically allocated area 153. One form of defense against such possible exploitation is to minimize the time window (temporal span) during which exploitable pointers such as those at stack locations VA1.1 and VA1.4 are left exposed and usable (e.g., still validated) in virtual memory (e.g., on a stack). More specifically, substantially soon after the allocation requesting application 140 finishes using the dynamically allocated area 153, pointer holding locations such as VA1.1 and VA1.4 should be quickly identified and the pointer values present in those respective locations should be deactivated by performing at least one of invalidating them, erasing them and/or overwriting them with useless data.

Before explaining in more detail how this can be done, reference is made to FIG. 1B and embodiment 101 thereof. Where practical in FIG. 1B, same or similar reference numbers are used for counterpart elements already described for FIG. 1A. Primed reference numbers are used in FIG. 1B to indicate modified components.

A pointer tracking method used by the embodiment 101 of FIG. 1B relies on the creation of a pointers tracking mechanism such as the hash table shown at 155 (or functional equivalents thereof). The pointers tracking table 155 is indexed (e.g., sorted) along its left most column 156$h$ on the basis of where in virtual memory tracked ones of so-called, "protected pointers" (PPtrs) are stored. In one embodiment, the entries of left most column 156$h$ are hashes of virtual addresses (VA's) while the second column 156 contains the unhashed full addresses. A third column 157 of the tracking table 155 contains unique allocation identification values (Alloc_ID_nn) where nn can be an integer number and where, for each newly allocated area and its first instance, master given pointer (e.g., Master_GivenPtr_01) that is designated as a protected pointer, a respective and unique allocation identification value (e.g., Alloc_ID_01) is created. The same unique allocation identification value (e.g., Alloc_ID_01) is also used for every "copied" pointer (e.g., Copy_of_GivenPtr_01) copied or otherwise derived from the respective master given pointer (e.g., Master_GivenPtr_01). As already partly indicated above, the value of the "copied" pointer need not to be exactly the same as the master pointer and/or associated bounds (column 159) of the copied pointer need not be exactly the same as the bounds of the master pointer. However the bounds of the associated copied pointers do need to be inside the bounds (e.g., between VA2 and VA3) of the area dynamically allocated (e.g., 153') for use with the respective master pointer (e.g., Master_GivenPtr_01). It is to be understood that programs can create large numbers of first and secondary instance pointers and thus the pointer tracking table 155 tends to be relatively large whereby searched through that table might take relatively long amounts of time and/or relatively large amounts of data processing resources if parallel processing is used.

In the illustrated example, in order to speed searching therethrough, pointers tracking table 155 is a hash table whose left most column 156$h$ (the table's index input column and optionally also its sorted-by column) contains hashes (preferably non-colliding hashes) of the virtual addresses of column 156 where the latter indicates where the correspondingly tracked pointers reside in virtual memory space. More specifically, VA1.1$h$ is a hash of the virtual address VA1.1 where the latter is the address in virtual memory space where an exemplary first Master_GivenPtr_01 is stored in stack 150'. Similarly, VA1.4$h$ is a hash of the virtual address VA1.4 where the latter is where an exemplary first Copy_of_GivenPtr_01 is stored in stack 150'. VA0.1$h$ is a hash of a virtual address VA0.1 (location in stack, content not shown in stack 150') where a second exemplary pointer, Master_GivenPtr_00 (in stack version, content not shown) is stored in stack 150' and VA0.4$h$ is a hash of the virtual address VA0.4 (not shown) where yet another exemplary pointer, Copy_of_GivenPtr_00 (not shown) is stored in stack 150'. An exemplary hash algorithm for table 155 may be one that keeps a predetermined number of the least significant bits (LSB's) of the actual virtual addresses unchanged (for example the lower 16 bits) while compressing a predetermined number of the most significant bits (MSB's) so as to reduce memory space consumed for addressing the pointers tracking table 155 (where the latter table may be sorted using the hashes as the sorting key) while generally avoiding hash collisions and allowing for faster searching through the table 155. In one embodiment, the hash is reversible, meaning that for each hashed value (e.g., VA1.4$h$) the corresponding unhashed counterpart (e.g., VA1.4) can be quickly determined for example by searching through the sorted first column 156$h$ and then looking up the counterpart full value in the second column 156 of table 155. In one example, a small number of candidate and corresponding unhashed counterpart locations are found and the contents of those found candidate locations are tested for a match against the full pointer address values of column 156 of table 155. If there is a match, it is taken to mean that the found location (e.g., VA1.4) of column 156 is the corresponding unhashed counterpart of the input hash value (e.g., VA1.4$h$) stored in column 156$h$. In the same embodiment, a high speed, multi-input associative cache 114 is used to provide even faster searching. During the cache search, the hashed value (e.g., VA1.4h) or the full valued virtual address (e.g., VA1.4) of where the pointer resides, and optionally at least one of the same-row contents of columns 157 and 158 of table 155 may be supplied as set associative inputs to the set associative cache (shown as 114 in FIG. 1B and as embodiment 214 thereof in FIG. 2) and if the associated data is present inside the multi-input associative cache 114, a cache hit is indicated. The retrieved cache payload provides counterpart additional data such as the unhashed virtual address (e.g., VA1.4 if only the hashed value e.g., VA1.4h was supplied), the full pointer value of column 158 and/or the corresponding address bounds of column 159. On the other hand, if the associated data is not present inside the cache 114, the cache will respond with a "cache missed" flag in place of a "hit" flag. (The implications of a "cache missed" flag will be detailed below when portion 3b of FIG. 2 is discussed. Briefly, it means that the corresponding protected pointer might be, but is not necessarily, invalid.)

While the illustrative version 155 of the protected pointers tracking table 155 of FIG. 1B directly stores in its respective columns 156, 157, 158 and 159 the immediate data representing the virtual address of the respective pointer (e.g., VA1.4), the allocation identifier associated with that pointer, the value of that pointer and the boundary defining parameters of that pointer; it is within the contemplation of the present disclosure to instead store in place of one or more of these table entries, a corresponding shorter link, tag or hashed value that leads to the respective ultimately sought data.

As indicated above, improved search speed is obtained in one embodiment by including the above mentioned, protected pointers cache 114 whose output payload can comprise one or more of the data items of columns 156h, 156-159 of tracking table 155 and whose output also indicates a hit or a miss with respect to one of the associative instruction inputs. More specifically, the protected pointers cache 114 can quickly indicate whether or not an entry for a questioned pointer is present in the cache. In one embodiment, only still-valid pointers are to be stored in the cache. If a pointer is searched for and found in the cache 114, that is taken to indicate that the pointer is still valid. On the other hand, if a given pointer is searched for and not found in the cache 114 (a cache search "miss"), then in one embodiment that alone does not mean the given pointer is invalid. On a miss, the larger tracking table 155 is searched to see if the missing pointer is nonetheless in the tracking table 155 and to see if the associated allocation identification value (Alloc_ID_nn) of column 157 is still valid. For the latter part of the test (validity of the associated Alloc_ID) a further table or ID's holding list such as 250 of FIG. 2 is searched. That table 250 will be described below.

Importantly, the use of the high speed, multi-input associative cache 114 allows for two things. First it allows for quick determination as to whether or not an entry is present in the cache for a given pointer, and if yes, that rapidly indicates the pointer is still valid. Second, it allows for rapid finding of all in-cache pointers tied to a unique allocation identification (e.g., Alloc_ID_01) and for the rapid deletion from the cache of those in-cache pointers. As will be explained in more detail below, a large number of pointers all pointing to an allocated portion of virtual memory space can all be simultaneously invalidated by deleting them from the cache 114 and doing just one more thing (e.g., removing the corresponding Alloc_ID from the ID's holding table 250 of FIG. 2). The hardware implemented and/or firmware implemented cache 114 can also be used to rapidly identify the locations in virtual memory space of in-cache master and copied pointers logically linked to a corresponding unique allocation identification (e.g., Alloc_ID_01). Aside from being useful for quickly verifying continued validity of in-cache pointers, the cache 114 may optionally be used to perform within-bounds conformity verifications for tested ones of the protected pointers having corresponding bound entries in the cache 114.

In one embodiment, the modified hardware platform 110' further contains in its microcodes storing area 118b', special opcodes dedicated to creating and filling in the contents of the protected pointers tracking table 155 and of the more-quickly searchable, protected pointers cache 114 and/or for generating and recording unique allocation identification values (e.g., Alloc_ID_01, Alloc_ID_00). Details with respect to such opcodes will be provided in the below descriptions of FIGS. 3, 4 and 5.

Figure 5:
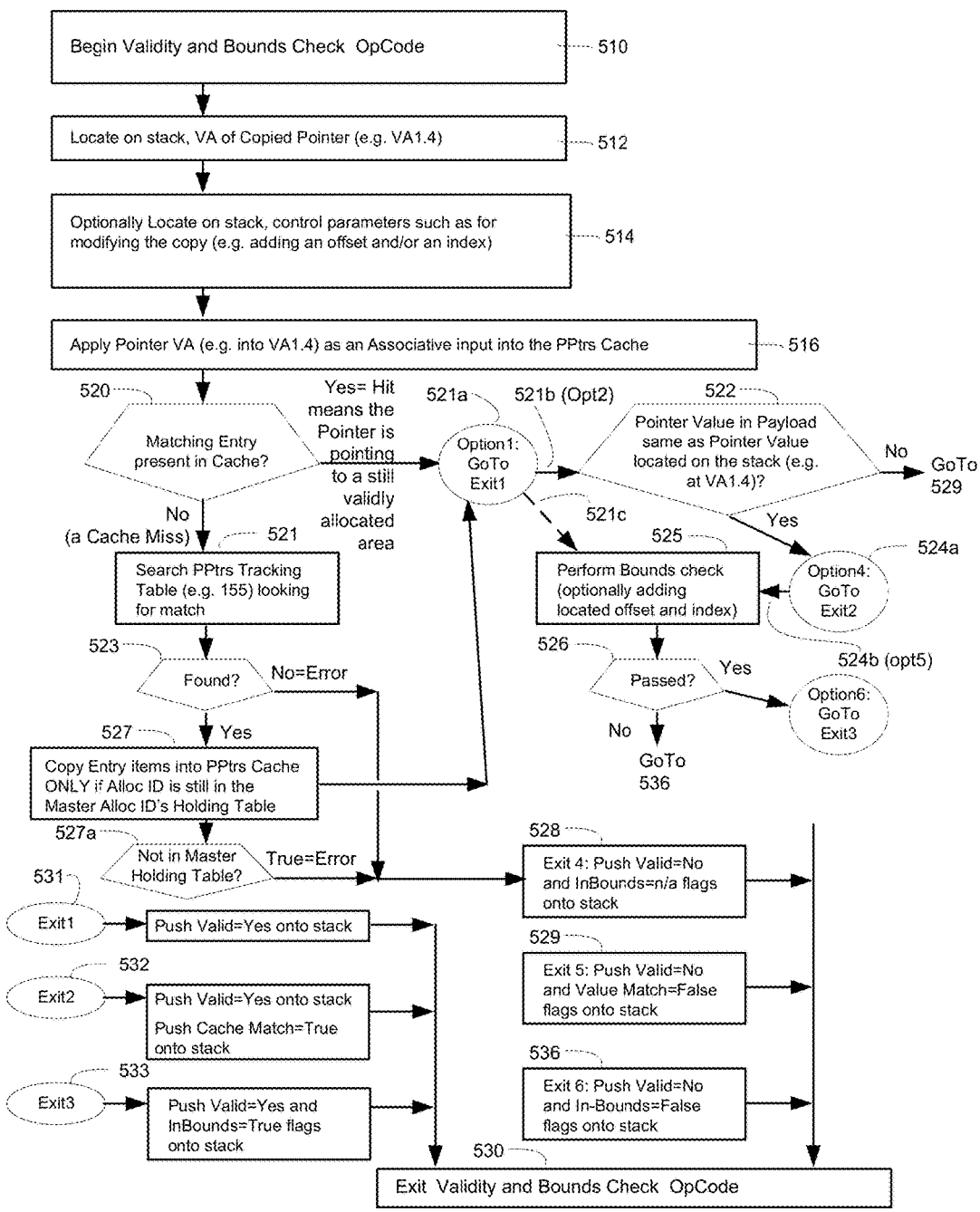
FIG. 5 is a flow chart depicting an opcode for checking validity of protected pointers and optionally checking compliance with boundary limits.

Implementation of the here-disclosed protected pointers scheme is generally a programming discipline rather than a forced outcome in system 101 of FIG. 1B. It is left up to the programmers of each application program (e.g., 140') to determine whether the protected pointers scheme is to be employed by their application, and if so with respect to which dynamically allocated memory areas (e.g., 153) and to what extent. For some legacy programs it may be desirable to not employ the protected pointers scheme (and that is fine, the legacy program will continue to work) or to employ it only to the extent of verifying continued pointer validity for just one or a few allocated areas while not bothering with bounds conformity checking as shall become clearer when the options of FIG. 5 are described below.

In the case of FIG. 1B and as an illustrative example, at modified instruction location 143' the application (App1') calls upon a protected pointers allocating routine (e.g., OS_GivePPtr) rather than a conventional dynamic area allocating routine (e.g., 143 of FIG. 1A). The protected pointers allocating routine (e.g., OS_GivePPtr) includes special opcodes (see also FIG. 3) including one for automatically obtaining a unique allocation identification value (e.g., Alloc_ID_01) for each newly allocated virtual memory area and its given first-instance master pointer. The special opcodes may further include one that automatically fills in the corresponding row of pointers tracking table 155 and adds the obtained unique allocation identification value (e.g., Alloc_ID_01) to a valid ID's holding table (e.g., 250 of FIG. 2) containing unique allocation identification values of currently valid allocated virtual memory areas whose pointers are protected ones. An example of such a protected pointers allocating routine (OS_GivePPtr) is illustrated in FIG. 3.

In the example of modified application program 140' (a.k.a. App1') of FIG. 1B, a subsequent instruction 144' calls upon a protected pointers copying opcode (e.g., Do Copy_GivenPPtr) rather than on a conventional pointer copying opcode or routine (e.g., push instruction 144 of FIG. 1A). An example of such a protected pointers copying opcode (e.g., Copy_GivenPPtr) is illustrated in FIG. 4. The protected pointers copying opcode (e.g., Copy_GivenPPtr) determines where on the stack 150' (or elsewhere) a copy (or derivative) of the master pointer should be placed, does so (e.g., into stack location VA1.4), and at the same time fills in the corresponding row of the protected pointers tracking table 155 by copying from the row (e.g., that of VA1.1h) of the corresponding master pointer the allocation identifier value (e.g., Alloc_ID_01 of column 157) into the row of the derived copy. In one embodiment, the copy of the master pointer has the same value as that of the master pointer and the bounds (e.g. Bounds_01') of the copy are the same as the bounds (e.g. Bounds_01) of the master. However, in some embodiments, the copy requesting application 140' may pass option parameters to the copy generating opcode (e.g., Copy_GivenPPtr at 144') so as to cause the latter opcode (or optionally a routine) to alter the value of the copy (to create a derivative rather than an exact copy) and/or to alter the bounds (e.g. Bounds_01') of the copy, where the altered bounds are nonetheless inside the original bounds (e.g. Bounds_01) of the master.

Although not explicitly shown in FIG. 1B, while instruction 145' is being executed so as to pass the copied protected pointer (e.g., Copy_of_GivenPtr_01 stored at VA1.4) to the called subroutine and before the so-passed protected pointer is utilized inside the called subroutine (e.g., SubRt2pp), a continued validity verification and bounds check is carried out inside the called subroutine to verify that the pointed to virtual memory area 153' is still a validly allocated area and that the utilization (e.g., pointer+offset+index) of the passed pointer is not extending outside of its assigned bounds (e.g., Bounds_01'). An exception flag is raised if the pointed to memory area 153' has been de-allocated in the interim or if the utilization of the passed pointer is extending outside of its assigned bounds (e.g., Bounds_01'). An example of such a validity and in-bounds verifying opcode (or optionally a routine) is illustrated in FIG. 5.

In the case where additional instruction steps 146' of FIG. 1B also request dynamic allocation of virtual memory space to them and/or use copies of the respective master pointers to the allocated memory areas, the steps of filling in corresponding rows in the pointer tracking table 155 and testing for continued validity and/or out of bounds utilization may be similarly carried out.

When it comes time for the application 140' to return to free space one or more of the memory areas that the application 140' dynamically had allocated to it, a de-allocation step such as modified instruction 147' is called. In one embodiment, the modified deallocation instruction 147' needs to do two things. First delete all pointer entries in the protected pointers cache 114 that are tied to the unique allocation identification value (e.g., Alloc_ID_01) of the being de-allocated area. And second, delete the unique allocation identification value (e.g., Alloc_ID_01) of the being de-allocated area from the valid ID's table (e.g., 250 of FIG. 2). This will have the effect of causing subsequent pointer validity checks for protected pointers of the de-allocated area to fail when, for example the validity checking routine 500 of FIG. 5 is run. The de-allocation step does not need to use the large protected pointers tracking table 155 to locate all the storage areas (e.g., on the stack 150') of each master given pointer and of all it's derived copies and then erase each one off the stack on a one by one basis. Instead the quick associative search function of the protected pointers cache 114 is used to simultaneously or otherwise rapidly identify and delete from the protected pointers cache 114 all pointers associated with the unique allocation identification value (e.g., Alloc_ID_01) of the being de-allocated area. Then, as mentioned, the unique allocation identification value (e.g., Alloc_ID_01) is erased from the valid ID's holding table (e.g., 250 of FIG. 2) where that erasure indicates that the earlier allocated area 153' has been returned to system free space. Since all the corresponding pointers to the earlier allocated area 153' will now be deemed invalid when a subroutine's (e.g., SubRt2pp called at step 145') continued validity verification and bounds check is carried out inside the called subroutine (e.g., the verification test 500 of FIG. 5), a sniffer program such as 170 can no longer use the code of that validity verifying subroutine (e.g., SubRt2pp called at step 145') for sniffing out its pointers and using them to access data within the earlier allocated area 153'.

Referring to FIG. 2, shown is a combination 200 of data structures (250, 255, 214) and method steps (210, 212, 216, 220-221 and 240) of one embodiment for automatically and repeatedly carrying out various protected pointer aspects of the current disclosure.

Table 250 is a Master Valid ID's holding table or list, an embodiment of which is referred to here as an allocation identification hash table. The hash-based embodiment of this valid ID's storing table or list 250 has the feature of being addressable with, and optionally being sorted according to, hashes of respective and unique allocation identification values rather than the substantially longer actual allocation identification values (e.g., Alloc_ID_01). Of course other forms of valid ID's holding lists may be used. An example of one hash-indexed entry is shown at 251. The allocation ID hash table 250 may be created as an initially empty such table during OS bootup. Then, as indicated by step 210, a respective application that wants additional virtual memory space allocated to it directly calls or has called on its behalf, a special protected pointer allocation opcode which assigns a unique identification (e.g., Alloc_ID_01) for the dynamically allocated additional area and stores the unique identification, for example at the hash-wise indexed entry location 251 of the pre-generated allocation ID hash table 250. In one embodiment, a simple 64-bit hardware up counter is used to generate the unique identification values. It is within the contemplation of the present disclosure to use alternative hardware generators (e.g., other forms of counters such as cyclical redundancy, pseudo random number generating counters) for generating unique identification values, for example by scrambling the bits of the up counter and/or performing various Boolean logic operations on the bits including for example XOR operations.

At step 212, the allocation requesting application executes, or has executed on its behalf, an allocation and pointer creation opcode which gets a master pointer (first instance pointer) from the operating system (OS) and stores the value 258.1 of the master given pointer as one of plural entries in a OS pre-created pointer VA hash table 255 (the middle table shown in FIG. 2). The other entries into the pointer VA hash table 255 may include the on-stack virtual address (VA) 256.1 of where the master given pointer is stored and bound parameters 259.1 indicating the size and/or other attributes of the dynamically allocated, additional memory area (e.g., 153' of FIG. 1B). Additionally, the entry for the newly allocated area and its master given pointer includes a copy 257.1 of the unique allocation ID 251 that had been assigned to the newly allocated area (e.g., 153 of FIG. 1B) and to its first instance master given pointer. In the case where the pointer VA tracking table 255 is a hash table (it does not need to be one), step 212 may additionally carry out hash table collision avoidance steps or compensating steps for handling colliding hash values where such avoidance and or compensating steps are known in the art of hash table creation. Optionally and additionally during this time, step 212 may scan through the allocation ID's column (257) of table 255 looking for allocation ID values that do not have matches in the master allocation ID hash table 250. A lack of a matching entry in the master allocation ID hash table 250 means that the corresponding entry in the pointer VA hash table 255 can be overwritten because it no longer belongs to a still valid pointer of a still allocated virtual memory area. Thus, if the process of step 212 finds such nonmatching entries in table 255, it may erase or overwrite them. As mentioned, in one class of embodiments, there must be a matching master allocation ID value (e.g., 251) inside the allocation ID table 250 for each corresponding entry row of the pointer tracking table 255 that refers to a valid protected pointer. If there is no such match, it means the corresponding memory area (e.g., 153' of FIG. 1B) has been de-allocated and the correspondingly found entries in the pointers tracking table 255 can be erased (or overwritten) and it also means that the corresponding entries (if any) in a below described protected pointers cache 214 need to be erased.

At step 216 the application (e.g., App1') which has had additional memory area dynamically allocated for it is about to call a subroutine. But before the call, the application uses a pointer copying opcode (or has one used on its behalf) to push a copy (or other derivative) of the master given pointer onto the stack. As this is done, the pointer copying opcode simultaneously adds a corresponding, copied pointer entry into the pointer tracking table 255 as indicated for example by entries 256.4, 258.4, 259.4 and 257.4. Here, VA entry 256.4 is the location on the stack (150') where the copy (or other derivative) of the master pointer has been pushed. The other entries, 258.4, 259.4 and 257.4 may be mere copies of the counterpart entries, 258.1, 259.1 and 257.1 made for the master given pointer 258.1. Of particular importance, the allocation ID 257.4 for the copy should be directly traceable to (e.g., linkable to, matchable to) the allocation ID 257.1 of the master so as to thereby keep track of all copies made from, or derived from the master given pointer. (In other words, to keep track of all protected pointers that point into the allocated virtual memory area that has that unique allocation ID 257.1 assigned to it.) In one embodiment, the bounds 259.4 of the copy and/or the value 258.4 of the copy need not be exactly the same as their counterparts, 259.1 and 258.1 of the master. It is to be understood that various techniques may be used for identifiably associating entries within the pointer tracking table 255 (and for identifiably associating entries within a below described multi-input associative cache 214) with counterparts in other portion of the system memory space including using the same full values, using masked portions of the full values, using hashes of the full values or hashes of masked portions of the full values, and using links to one of said full or derived values. It is within the contemplation of the present disclosure to use any or all of these various techniques within the pointer tracking table 255 (and/or within the below described multi-input associative cache 214) for identifiably associating (linking) the respective entries with their counterparts in other portion of the system memory space such that a specific linkage is provided between the entry and the identifiably associated counterpart.

At step 220, the subroutine which has been called by the allocation receiving application (e.g., App1') is about to make use of the on stack copy of the pointer 258.4. Before doing so however, the subroutine uses (or has used on its behalf) a pointer validity checking opcode which verifies that the pointer copy (e.g., 258.4) is a valid pointer pointing to a still-allocated part (e.g., 153) of virtual memory. Here, in order to speed performance, the pointer cache 214 is used first in an attempt to more quickly access the pointer verification information for the suspect pointer copy (e.g., 258.4). If the pointer cache 214 has an entry (e.g., 258.4') matching the information of the suspect pointer copy (e.g., 258.4) then that cache hit by itself can indicate the suspect pointer copy is valid. Nothing more needs to be done. In one embodiment, the on stack address (e.g., 256.4') of the suspect pointer copy (or a hash of that on stack address) is provided as input associative data to the pointer cache 214 and then the cache 214 quickly returns a hit indication and also returns in its corresponding payload, other associated information for the pointer such as the pointer value 258.4' and the allowed bounds 259.4'. A second associative input query to the multi-input associative cache 214 allows the unique allocation ID (e.g., the one stored at 257.4' or a hash thereof or another representative thereof) to be used for identifying all pointer entries in the multi-input associative cache (e.g., including that having the pointer value stored at 258.4) that are identifiably linked to the unique allocation ID. Use of the returned payload from the multi-input associative cache upon a hit is optional for pointer verification as shall be detailed below with respect to FIG. 5. In one embodiment, the mere fact that a matching entry is found (is hit) in the pointer cache 214 is enough to verify that the suspect pointer copy (e.g., the one stored at the VA identified by cache entry 256.4') is a valid one. This will be so because as mentioned above, entries in the pointer cache 214 that do not have a matching allocation ID in the master table 250 or which belonged to a now-deallocated area are automatically scrubbed. Thus, the fact that the hit-upon match in the pointer cache 214 is still there generally means that the suspect pointer copy is a valid one pointing to a still allocated area. Thus, pointer verification can be carried out very quickly due to the speed of the hardware-implemented pointer cache 214. In some embodiments, as shall be detailed for FIG. 5, validity checking of a suspect pointer copy may be more involved and may include bounds checking and/or value matching.

In one embodiment, the occurrence of a cache miss (step 221) does not instantly mean that the suspect pointer copy is an invalid one. There could be various reasons why a still valid copy stored in the larger/slower pointers tracking table 255 is no longer in the faster but smaller, pointers verifying cache 214. For example, it could have been a long time since the entry for the suspect pointer copy was last tested by way of the pointer cache 214 and that cache entry slot may have been filled with (overwritten by) a more frequently tested and/or more recently used pointer entry. Therefore, in step 221 the process reverts to the pointer tracking table 255 to search for a matching copy in that tracking table 255. If one is found and the unique matching allocation ID is still in the master ID's holding table 250, that means that the suspect pointer copy is still valid and an entry for it is copied into the pointer cache 214. On the other hand, if no match is found in the tracking table 255 or the unique matching allocation ID is no longer present in the master table 250, that means that the suspect pointer copy is invalid and appropriate exception flags are raised.

For the case of de-allocation step 240, FIG. 2 shows how the various data table structures may be used for quickly invalidating all protected pointers (first and secondary instances) that point to a de-allocated virtual memory area where the latter area has a unique allocation ID (e.g., 251 and 257.1) assigned to it. The unique allocation ID (or a hash thereof) is applied to the corresponding associative input of the protected pointers cache 214 for thereby identifying all the entries in the cache 214 that match that unique allocation ID (e.g., 257.1) of the being de-allocated virtual memory area (e.g., 153'). The found matches (hits) in the cache 214 are erased or overwritten with other data. Also, that same unique allocation ID (e.g., 257.1) is deleted from the master allocation ID's holding table 250 (e.g., from entry location 251). The effect of this two step process 240 will be that future attempts to find a hit for a corresponding pointer in the cache 214 (per step 220) will instead fail and return a cache miss indication (3b) and then the follow up step 221 will discover that the required entry in the master allocation ID's holding table 250 (e.g., that of location 251) is missing, thus concluding that the corresponding pointer is invalid. As an option, if the routine also locates the entry in the pointers tracking table 255, it may erase or overwrite that entry row (e.g., the row of Alloc ID 257.1) because it is now known that the entry row refers to a no longer valid pointer (because Alloc ID 257.1 no longer appears in the master allocation ID's holding table 250, e.g., at erased location 251).

Referring to FIG. 3, an example 300 of a routine (e.g., OS_GivePPtr) for generating a master given protected pointer will now be described. At step 310, the allocation requesting application (e.g., App1') calls upon the corresponding, protected pointers giving routine (e.g., OS_Give-PPtr) which will generally be an optional privileged OS Library routine included in the static application declarations 141' when the protected pointers feature is desired to be used.

At step 310 the privileged OS memory space allocation routine begins. At step 312 the routine actuates a first protected pointers opcode (e.g., called Give1) which increments an allocation ID generator (e.g., up counter or pseudorandom number generating counter) so as to provide a next unique identification value (e.g., Alloc_ID_01). Then the actuated first opcode (e.g., Give1) concatenates the generated identification value as a new next entry (e.g., 251) into the master allocation ID hash table 250 and returns.

At step 316 control returns to the OS_Give_PPtr routine and the routine optionally fetches allocation request parameters such as ones specifying the size of the requested virtual memory area (e.g., 153'), the types of data to be included in the requested area (e.g., R/W and/or X/NX permissions for each) and a short length tag to be associated with the longer length given pointer that is expected to be returned to the OS_Give_PPtr routine.

At step 318, the routine forwards the corresponding allocation request to the hypervisor and waits for a grant of the request. (Although not shown, the OS_Give_PPtr routine may include exception handling code for dealing with situations where the requested allocation of memory is denied for one reason or another.) At step 320 the routine pushes the given master pointer onto the stack and makes note of the virtual address (e.g., VA1.1) at which the master given pointer is stored on the stack.

At step 322, the routine actuates a second protected pointers opcode (e.g., called Give2) which automatically adds an entry into the pointers tracking table 255 for the noted virtual address (e.g., VA1.1) of the master given pointer (e.g., Master_Given_Ptr_01), for the value of the given pointer (e.g., into column 158 of FIG. 1B), for the bounds of the given pointer (e.g., into column 159 of FIG. 1B) and for the new and unique allocation ID value (e.g., Alloc_ID_01 into column 157 of FIG. 1B) of the master given pointer. As in the case of the Give1 opcode the Give2 opcode executes very quickly and therefore support for filling in the corresponding entry in the pointers tracking table 255 does not make any significant impact on performance speed of the application (e.g., App1') that is utilizing the protected pointers feature. At step 329, control returns to the OS_Give_PPtr routine. In one embodiment the routine may optionally execute additional instructions before exiting.

Referring to FIG. 4, provided is a flow chart 400 of another special opcode (e.g., Copy_GivenPPtr) that may be incorporated among the protected pointers supporting opcodes stored in memory area 118b' of FIG. 1B. The illustrated Copy_GivenPPtr opcode is actuated at step 410 by an application (e.g., App1') that plans to soon call a subroutine and wishes to push a copy of the master given pointer (or a derivative thereof) onto the stack.

At step 412, the opcode locates on the currently active stack, the virtual address (e.g., VA1.1) of a pointer that is to be copied (e.g., Master_Given_Ptr_01) and the virtual address (e.g., VA1.4) of where the copy is to be placed, for example elsewhere on the stack.

Step 414 is optional and may be included in response to global control parameters set by the declarations section 141' of the application (e.g., App1') that is planning to use the protected pointers feature. In step 414, the opcode locates on the stack and in accordance with predetermined protocols, control parameters that may determine various options of the opcode such as modifying the copy of the master given pointer (e.g., by adding one or both of a supplied offset and index) and/or such as modifying the copy of the bounds of the master given pointer (e.g., by making them smaller while remaining within the bounds of the master given pointer).

At step 416 the actuated opcode stores into the obtained address of where the copy is to go (e.g., into VA1.4) the copy or the modified copy of the original pointer (e.g., gotten from VA1.1).

In subsequent step 420, the actuated opcode automatically adds a new entry into the pointers tracking table 255 for the stored and optionally modified copy of the original pointer while using the same unique allocation identification value (e.g., Alloc_ID_01) as that assigned to the original pointer. At the same time the actuated opcode also automatically adds into the pointers tracking table 255, the copy of the bounds of the original pointer or optionally modified bounds derived from that of the original. Then at step 425, the actuated opcode automatically enters into the pointers tracking table 255 the value of the destination address (e.g., VA1.4) where the copy was stored. The opcode then exits at step 429. Once again, by using fast executing opcodes, the protected pointers support features of the present disclosure fill in the desired entries into the tracking tables quickly and with minimal impact on the performance speed of the application (e.g., App1') that is making use of the protected pointers feature. (Optionally, the Copy_GivenPPtr opcode could also insert the corresponding data for the newly added pointer into the protected pointers cache 214. However since it is generally not known, when, if ever that specific newly added pointer will next be used again, it is preferable not to fill up the finite sized protected pointers cache 214 with additional pointer data and instead to wait for when a verification of the same pointer is first requested before adding its data into the cache 214. In the described embodiment, that will happen inside the next described, Validity and Bounds Check opcode.)

Referring to FIG. 5, provided is a flow chart 500 of another special opcode (e.g., Validity and Bounds Check) that may be incorporated among the protected pointers supporting opcodes stored in memory area 118b' of FIG. 1B. The illustrated Validity and Bounds Check opcode is actuated at step 510 by an application (e.g., App1') or subroutine that plans to soon use a copy of a protected pointer that had been pushed onto the stack.

At step 512, the opcode locates on the currently active stack, the virtual address (e.g., VA1.4) of where the copy is placed. Step 514 is optionally executed if the global protected pointers declarations (e.g., 141' of FIG. 1B) had indicated that additional control parameters will be placed on the stack. In that case step 514 locates in the designated relative portions of the stack, the corresponding control parameters used for example for modifying the on stack copy (e.g., the one at VA1.4) by adding to it at least one of a prespecified offset and prespecified index value.

Verification of the validity of a suspect pointer copy takes place at step 516. The virtual address (e.g., VA1.4) of where the suspect copy is stored (or in one embodiment, a hash of that storage address value) is supplied as an associative input into the protected pointers cache 114/214. If there is an associative match, that means the suspect copy is valid. This so because it got there (into cache 114/214) due to the actions of below described steps 521 and 527 and the latter two made sure the pointer was valid. Next, at the Yes (cache hit) outcome of step 520 the cache 114/214 will output a hit indication and a corresponding payload (e.g., 258.4', 259.4' of FIG. 2). For some embodiments, the mere fact that test step 520 resulted in finding a match in the protected pointers cache 114/214 (the "Yes" result) is all that is needed for completing the desired verification. If that is the case, then Option1 step 521 a is taken and control is passed to a corresponding Exit1 operation 531. A valid equals yes flag is pushed onto a predetermined part of the stack and then the opcode exits at step 530

On the other hand, in other embodiments where it is desired to verify more than the fact that a match exists on the protected pointers cache 114/214, at least one of second option path 521b and third option path 521c is taken. Before explaining the second and third options however, the process following a "No" result (a cache miss) outcome from step 520 will be described. Just because a matching copy is not found in the protected pointers cache 114/214 does not of itself always mean that the suspect pointer is not valid. There may be various reasons why an entry (e.g., a previously present entry) in the cache 114/214 for the suspect pointer is not there. One possibility is that this particular pointer has no been used for a long time and other pointer entries overwrote its spot in the finite memory of the high-speed protected pointers cache 114/214. In view of this, at step 521 a search is made of the larger protected pointers tracking table 155/255 to see if a matching entry is found there. If the result of test step 523 is yes, a match was found in the tracking table 155/255 then control is passed to step 527. In step 527, a copy of the found entry is added to the protected pointers cache 114/214 only if it is further determined that the corresponding unique allocation identification value (e.g., Alloc_ID_01) is still stored in the Master ID's Holding Table (e.g., 250). Thus two conditions are tested for, namely, that the suspect pointer is listed in the protected pointers tracking table 155/255 AND that a matching unique allocation identification value is stored in the Master ID's Holding Table (e.g., 250). If both of the latter conditions are true then control is next passed to option step 521a where one possibility is that Exit1 (531) is taken. On the other hand, if the result of test step 523 is no, then control is passed to error exit step 528. Also if the result of a test 527a for presence in the Master ID's Holding Table (e.g., 250) indicates the corresponding Alloc_ID is missing control is also passed to error exit step 528. In step 528 a valid equals no flag is pushed onto the stack and then the opcode exits at step 530. What is done next in response to the error condition of exit step 528 may vary. One option, if the corresponding Alloc_ID was missing from the Master ID's Holding Table (e.g., 250), is to delete from the protected pointers tracking table 155/255 all entries having that no longer valid, Alloc_ID value. Another option is to raise and an exception flag and pass control over to the operating system (OS) for handling of the error condition.

If the second option path 521b is taken following the yes result of test step 520 (or the no error outcome of step 527), then a further test is performed at step 522 where in one embodiment that further test verifies that the pointer value in the cache payload is the same as the pointer value located on the stack (e.g., at VA1.4). If the values do not match, that may indicate that a malicious third-party actor has altered one of the pointer values and the planned use of the suspect pointer copy may result in undesirable consequences. A mismatch out of step 522 results in the taking of an error Exit5 (step 529) wherein a valid equals no flag is pushed onto the stack and a value match equals false flag is also pushed onto the stack. Then the opcode exits at step 530. What is done next in response to the error condition of exit step 529 may vary.

If the result of optional test 522 is Yes, then one follow-up option 524a is to proceed to an Exit2 step 532 in which a pointer valid true flag is pushed onto the stack and also a values match test true flag is pushed onto the stack. Then the opcode exits at step 530. What is done next in response to the non-error condition of exit step 532 may vary. Generally, the verification tests passing pointer is deemed OK to use.

A fifth option 524b is to follow up success in the values match test 522 with a within-bounds verification test 525. The within-bounds verification test 525 may also be the next step for option path 521c. In bounds verification test 525, the corresponding bounds parameters (e.g., 259.4' of cache 214) are used to determine if the suspect pointer value (e.g., at VA1.4) points to an address inside the corresponding bounds and/or if the informational data item that is pointed to by the suspect pointer value does not extend outside of the corresponding bounds. In one embodiment, at least one of a predetermined index value and offset value is added to the value of the suspect pointer (e.g., the one at VA1.4) before the inbounds test for the start and/or end of the pointed to data item is carried out. If the result of the within-bounds test 526 is Yes then a sixth option is taken to successful Exit3 step 533. Exit3 step 533 includes the pushing onto the stack of a valid equals yes flag and an inbounds equals true flag. Although not shown, an additional flag may be a values match true flag if the pointer value match test 522 has also been successfully passed.

On the other hand if the result of the within-bounds test 526 is No, control passes to an unsuccessful Exit6 step 536 where a valid equals no flag is pushed onto the stack and an in-bounds equals false step is pushed onto the stack. Although not shown, an additional flag may be a values match true or false flag if the pointer value match test 522 has been successfully passed or not. Then the opcode exits at step 530. What is done next in response to the error(s) condition reporting of exit step 536 may vary. When one or more error conditions are reported by way of exit step 530, one of the follow-up options is to invalidate all pointer copies having the corresponding same allocation identification value by removing them from the cache 114/214.

Figure 6:
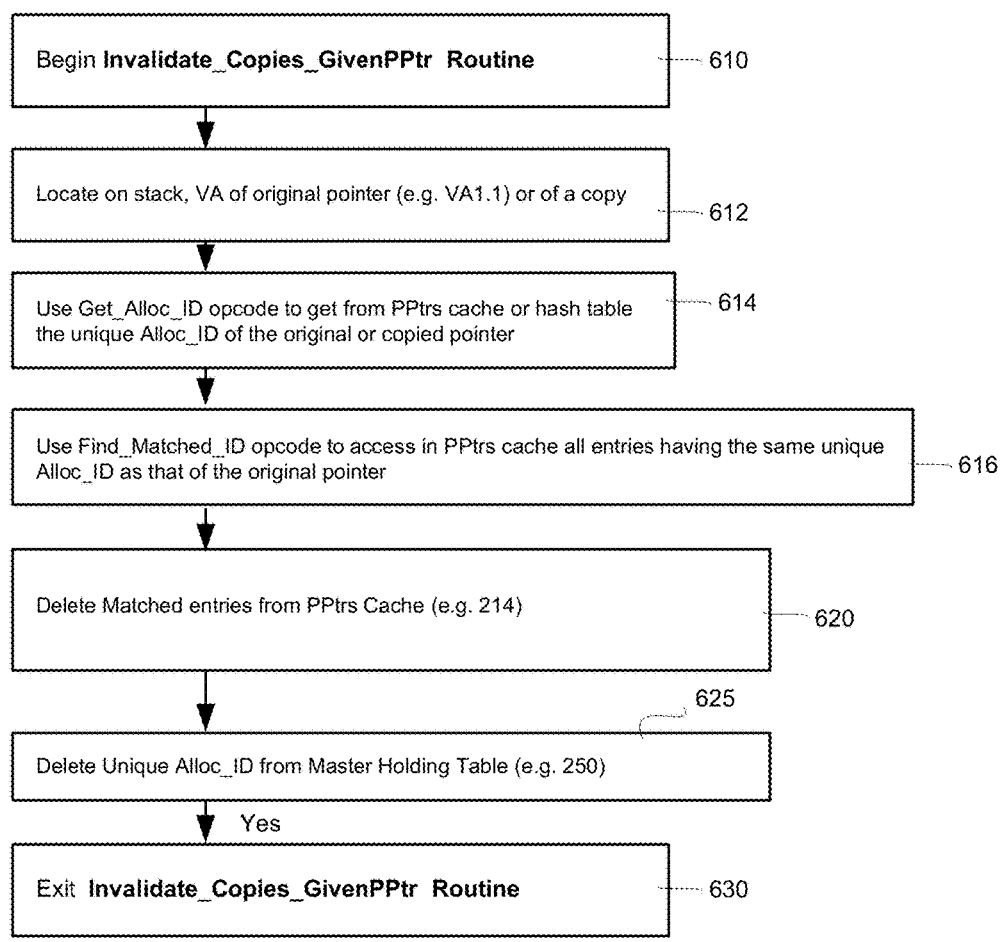
FIG. 6 is a flow chart depicting a process for deleting pointer copies.

Referring to FIG. 6, shown is a flow chart 600 for carrying out an invalidate all copies routine. At step 610 the routine is started under supervision of the operating system. At step 612 the location on the stack (e.g., VA1.1) of the corresponding master pointer is identified or alternatively the location on the stack of a corresponding copy or derivative pointer is identified. Next, at step 614 a special Get_Alloc_ID opcode is executed so as to quickly fetch from at least one of the protected pointers cache 114/214 or the pointers tracking table 155/255 the associated unique allocation identification value (e.g., Alloc_ID_01) of the identified master or copy/derivative pointer.

Then at a subsequent step 616, a further special opcode, Find_Matched_ID is executed so as to quickly find (identify) in the protected pointers cache 114/214 all entries having the unique allocation identification value (e.g., Alloc_ID_01 or hash thereof) obtained in step 614. At step 620, the routine deletes all the found (identified) entries in the protected pointers cache 114/214 having the unique allocation identification value (e.g., Alloc_ID_01 or hash thereof). This is followed in step 625 by deleting the same associated unique allocation identification value (e.g., Alloc_ID_01) from the master ID's holding table (e.g., 250). At this point, as a result of the high speed deletions from the cache 114/214 in step 620 and the one deletion in step 625 of the associated unique allocation identification value from the master ID's holding table (e.g., 250), all the protected pointers having that same allocation identification value (e.g., Alloc_ID_01) will have been invalidated because at least one of steps 523 and 527a in FIG. 5 will be followed by an invalidity exit via step 528 (because the required entries for a suspect pointer will not be found in the cache and in the master ID's holding table). This outcome will make it difficult for a sniffing program (e.g., 170) to exploit left behind code (e.g., SubRt2$pp$ called at step 145' in FIG. 1B) for finding valuable pieces of information (e.g., user passwords) that may have been embedded in now de-allocated memory area (e.g., 153') because the pointer validity checks (e.g., process 500 of FIG. 5) performed by that left behind code (e.g., SubRt2$pp$ 145', assuming it is well behaved) will fail.

In view of the above, it may be seen that system and application managed memory allocation routines can use the Protected Pointers features together in a same shared virtual area. Application and system software can verify that the area allocations associated with each master pointer or any of its copies or derivatives is still valid. They can check that an effective address is within the allocation bounds (via the within-bounds check), and that a pointer or copy value has not changed (via the value match test) and that its pointed-to allocated area (e.g., 153') has not been de-allocated. One option allows a changed value to skip effective address bounds checking or check bounds but not fail due to the changed pointer if its allocation ID is still valid (e.g., still present in the Master ID's holding table 250) and thus even changed pointer values can interoperate with software that changes pointer values. Data structures that have significant security consequences should be the targets for Protected Pointer use. In one embodiment added CPU instructions (opcodes) are introduced to support Protected Pointers protocol so as to automatically enter the associated data into appropriate tracking tables (e.g., 255), caches (e.g., 114 or 214) and ID holding tables (e.g., 250) and to automatically allow for fast validity checking by way of the cache and for fast invalidation by way of the cache and the ID holding table. The associated table entries (e.g., those of tables 250 and 255) may be stored in a metadata holding area while the multi-input associative cache (e.g., 114/214) is hardware and/or firmware implemented so as to provide rapid response speed at least for purposes of validity checking.

More specifically, here disclosed methods for at least one embodiment include those that: (a) Verify that the space allocation associated with a pointer (or copy thereof or derivative thereof) is still validly allocated to prevent use-after-free; (b) Check effective address bounds and pointer (or copy) value with interoperability allowing options even when a copy value has changed; (c) Do not require new process states—in one embodiment a small portion of virtual memory space is reserved to contain the metadata where the size of the reserved portion is proportional to Protected Pointer use; (d) the Protected Pointers use can be customized for selective use only with significant security value data structures; (e) it does require instrumented application code that can be intermixed (made compatible with) PPtr's unaware other code. Hardware validity testing and metadata caching can be used to minimize performance speed reduction.

Example Operating Environment

Figure 7:
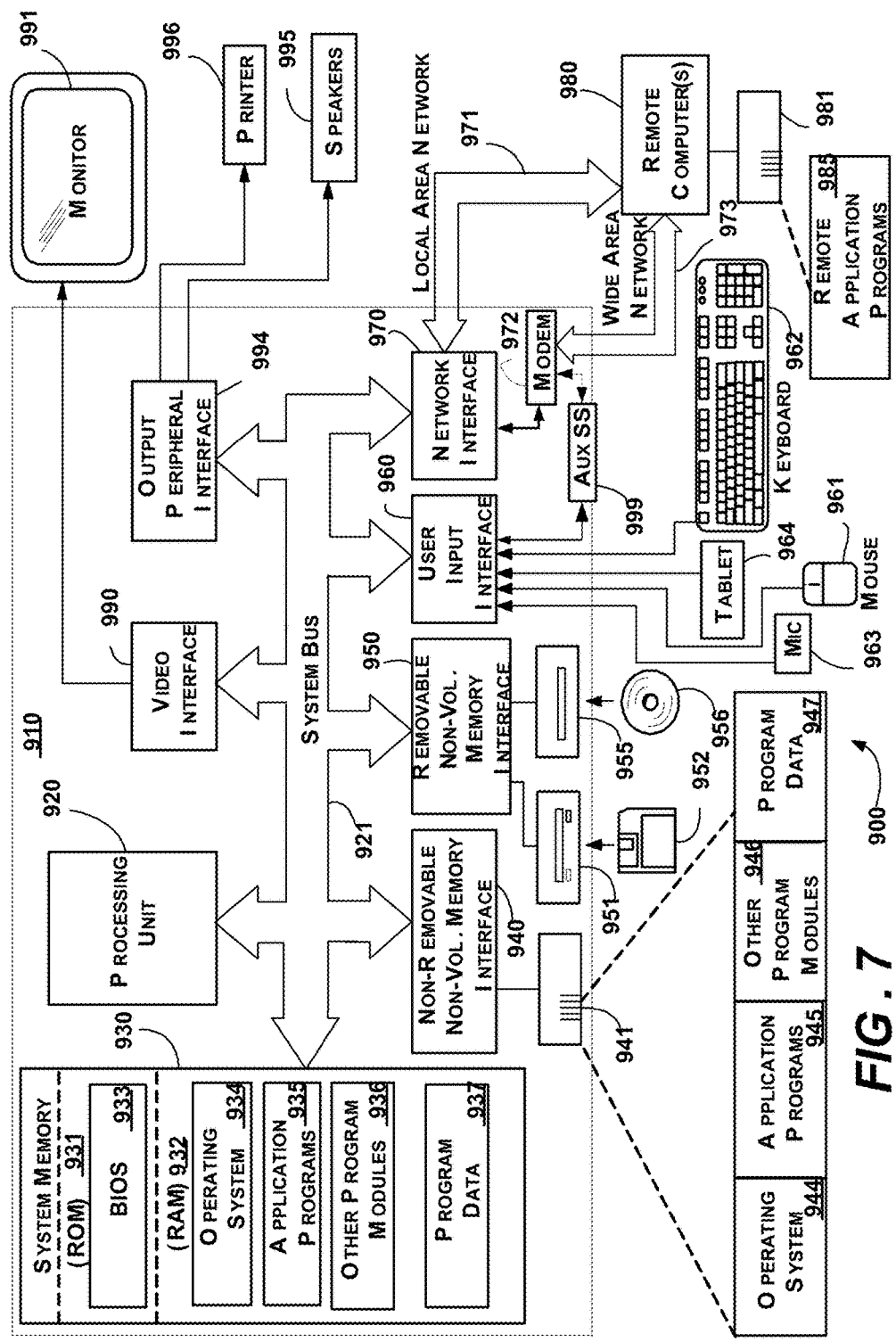
FIG. 7 illustrates an example of a suitable computing and networking environment into which the examples and implementations of any of FIGS. 1-6 as well as any alternatives may be implemented.

FIG. 7 illustrates an example of a suitable computing and networking environment 900 into which the examples and implementations of any of FIGS. 1-6 as well as any alternatives may be implemented. The computing system environment 900 is only one example of a suitable computing environment and is not intended to suggest any limitation as to the scope of use or functionality of the embodiments of the present technology. Neither should the computing environment 900 be interpreted as having any dependency or requirement relating to any one or combination of components illustrated in the example operating environment 900.

Embodiments of the present technology are operational with numerous other general purpose or special purpose computing system environments or configurations. Examples of well known computing systems, environments, and/or configurations that may be suitable for use with the embodiments of the present technology include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Certain embodiments of the present technology may be described in the general context of computer-executable instructions, such as program modules, being executed by a computer. Generally, program modules include routines, programs, objects, components, data structures, and so forth, which perform particular tasks or implement particular abstract data types. Certain embodiments of the present technology may also be practiced in distributed computing environments where tasks are performed by remote processing devices that are linked through a communications network. In a distributed computing environment, program modules may be located in local and/or remote computer storage media including memory storage devices.

With reference to FIG. 7, an example system for implementing various aspects of certain embodiments of the present technology may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 6 illustrates operating system 934, application programs 935, other program modules 936 (e.g., a hypervisor) and program data 937.

The computer 910 may also include other removable/non-removable, volatile/nonvolatile computer storage media. By way of example only, FIG. 7 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 7, provide storage of computer-readable instructions, data structures, program modules and other data for the computer 910. In FIG. 7, for example, hard disk drive 941 is illustrated as storing operating system 944, application programs 945, other program modules 946 (e.g., hypervisor code) and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 7 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 7. The logical connections depicted in FIG. 6 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 7 illustrates remote application programs 985 as residing on memory device 981. It may be appreciated that the network connections shown are examples and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state.

The auxiliary subsystem 999 may be connected to the modem 972 and/or network interface 970 to allow communication between these systems while the main processing unit 920 is in a low power state.

As a nonlimiting overview of the present disclosure it is seen that what has been disclosed includes a machine-implemented method for managing pointers pointing to a memory area of a data processing system, where the method comprises the steps of: (a) associating with each of a plurality of protected pointers that point to an allocated area in memory, a corresponding and unique allocation identifier assigned to that memory area; (b) associating the corresponding and unique allocation identifier with the respective storage locations of each of the plurality of protected pointers; (c) using the unique allocation identifier to locate in a multi-input associative cache, entries for one or more of the protected pointers when the correspondingly allocated area is being, or has been de-allocated; (d) deleting the located entries; and (e) deleting from a protected pointers holding list, the corresponding and unique allocation identifier of the respective, de-allocated memory area.

The above method can be one where: one or more of the protected pointers is located in a stack area used by one or more application programs or routines.

The method can be one where: the data processing system includes a hypervisor which manages virtualization of one or more memory areas of the data processing system; and the protected pointers include a first instance given pointer that is given by the hypervisor as pointing to a newly allocated virtual area in a corresponding virtual memory space.

The method can be one further comprising: storing as part of the respective tracking entry of the protected pointers tracking table, an identifier of a respective value of the corresponding copy of the given pointer and storing as part of the respective tracking entry of the protected pointers tracking table, an identifier of a respective one or more boundary parameters of the corresponding copy of the given pointer.

The method can be one further comprising: storing as part of a respective cache entry of a multi-input associative cache that stores entries for protected pointers, an identifier of the respective storage location of the given pointer, an indicator of its association with the corresponding and unique allocation identifier of the allocated memory area to which it points; wherein the stored identifier of the respective storage location and the stored indicator of the pointer's association with the corresponding and unique allocation identifier are structured to be found by set associative inputs of the cache such that an associative match (hit) by the cache for either one of the stored identifier of the respective storage location and the stored indicator of its association with the corresponding and unique allocation identifier indicates the cache entry is present and the corresponding given pointer is a valid one pointing to a still allocated memory area.

The method can be one further comprising: storing as part of a respective cache entry of the protected pointers cache, at least one of the value of the pointer and boundary parameters of the pointer where the stored value of the pointer and the stored boundary parameters are structured to be part of a payload output of the protected pointers multi-input associative cache.

The method can be one further comprising: applying as a set associative input to the protected pointers cache, at least one of the stored identifier of the respective storage location and the stored indicator of its association with the corresponding and unique allocation identifier; and determining in response to a match miss by the protected pointers cache that the corresponding given pointer might be (but not necessarily) pointing to a de-allocated memory area.

Additionally, it is seen that what has been disclosed includes a data processing system configured to automatically manage pointers pointing to a memory area of a data processing system, the system comprising: (a) one or more processors configured to execute a corresponding one or more applications; (b) a unique identifier generator configured to associate with each newly allocated area in a corresponding memory area (each newly allocated area that is to have protected pointers pointing to it), a corresponding and unique allocation identifier; (c) a protected pointers tracking mechanism configured to associate the corresponding and unique allocation identifier with a respective storage location of every protected pointer that points to the corresponding memory area; (d) a multi-input associative cache configured to use the unique allocation identifier to quickly locate within the cache, entries for protected pointers that are associated with a given unique allocation identifier; and (e) a protected pointers invalidating mechanism operatively coupled to the multi-input associative cache and to a ID's holding list or table and configured to delete from the cache all entries associated with a given unique allocation identifier and to also delete from the ID's holding list or table, the corresponding given unique allocation identifier.

Additionally, it is seen that what has been disclosed includes a data processing machine comprising: (a) one or more processors configured to execute a corresponding one or more applications, the processors being responsive to microcodes stored in a microcodes storing area, wherein the microcodes storing area stores: first microcode corresponding to a first instance pointer giving opcode, the first microcode being configured to cause a hardware generator of the data processing machine to generate a corresponding and unique allocation identifier for logical association with a corresponding a newly allocated area in a corresponding memory space of the data processing machine where the first instance pointer points to that newly allocated area; and second microcode corresponding to a secondary pointers tracking opcode, the second microcode being configured to automatically add a protected pointers tracking entry into a protected pointers tracking table where the tracking entry includes an identifier of a respective storage location of a given secondary instance pointer and an indicator of its association with a corresponding and unique allocation identifier.

CONCLUSION

While the embodiments of in accordance with the present disclosure are susceptible to various modifications and alternative constructions, certain illustrated embodiments thereof are shown in the drawings and have been described above in detail. It should be understood, however, that there is no intention to limit embodiments of the present disclosure to the specific forms disclosed, but on the contrary, the intention is to cover all modifications, alternative constructions, and equivalents falling within the spirit and scope of the present teachings.

What is claimed is:

1. A machine-implemented method for managing pointers pointing to allocated portions of a memory space of a data processing system, the method comprising:

associating with each of a plurality of pointers that each points to an allocated area in the memory space, a corresponding and unique allocation identifier of the allocated area;

storing in a multi-input associative cache, associated data of at least a subset of the plurality of pointers, the stored associated data of each respective one of the at least subset of the pointers including a respective address value pointing to a respective storage location of the respective pointer, the stored associated data also identifiably linking the respective address value with the unique allocation identifier and thus with the allocated area to which the unique allocation identifier is assigned;

using the unique allocation identifier, or a hash thereof, or another identifying derivative thereof to determine if the associated data of one or more of the plurality of pointers is present in the multi-input associative cache;

adding to an identifications holding list, the unique allocation identifier assigned to each newly allocated area that is a protected pointers area; and in response to an indication that the associated data of one of the plurality of pointers is not present in the multi-input associative cache, checking the identifications holding list for presence therein of the unique allocation identifier that is identifiably linked to the pointer determined to not have its associated data in the multi-input associative cache.

2. The method of claim 1 wherein the allocated area is an area in a virtual memory space of the data processing system.

3. The method of claim 2 wherein the respective address value pointing to a respective storage location is a virtual address at which the corresponding pointer is stored.

4. The method of claim 1 wherein the associated data stored in the multi-input associative cache for each respective one of the at least subset of the pointers includes at least one of a hash of and a value of an address in the memory space where the respective pointer is located.

5. The method of claim 1 wherein the associated data stored in the multi-input associative cache for each respective one of the at least subset of the pointers includes at least one of a hash of and a value of the respective pointer.

6. The method of claim 1 wherein the associated data stored in the multi-input associative cache for each respective one of the at least subset of the pointers includes a definition of one or more boundary constraints for the value of the respective pointer or for the code or data the respective pointer points to.

7. The method of claim 1 wherein the associated data stored in the multi-input associative cache for each respective one of the at least subset of the pointers includes at least one of the unique allocation identifier, a hash of the unique allocation identifier and other data identifiably linking the respective pointer with the unique allocation identifier.

8. The method of claim 1 and further comprising:
adding to a pointers tracking list, the associated data of each of the plurality of pointers that each points to an allocated area; and
in response to an indication that the associated data of one of the plurality of pointers is not present in the multi-input associative cache, checking the pointers tracking list for presence therein of the associated data of the pointer that is determined to not have its associated data in the multi-input associative cache.

9. The method of claim 8 and further comprising:
in response to an indication that the checked for unique allocation identifier is not present in the identifications holding list or to an indication that the checked for associated data of the pointer is not present in the pointers tracking list, halting execution of executing code that indicates intention to use the pointer.

10. The method of claim 8 and further comprising:
deleting from the multi-input associative cache, the associated data of all of the pointers identifiably linked to the unique allocation identifier; and
deleting from the identifications holding list, the unique allocation identifier.

11. The method of claim 2 wherein:
the data processing system includes a hypervisor which manages virtualization of one or more portions of the memory space of the data processing system; and
the pointer to the allocated area is a first instance one given by the hypervisor in response to an application request for the allocated area.

12. The method of claim 1 wherein:
the data processing system is configured to have a first opcode by way of which said storing in the multi-input associative cache of associated data of at least one of the plurality of pointers can be automatically performed; and
the data processing system is configured to have a second opcode by way of which said using of the unique allocation identifier or a hash thereof or another identifying derivative thereof to determine if the associated data of at least one of the plurality of pointers is present in the multi-input associative cache can be automatically performed.

13. A data processing system configured to automatically manage pointers pointing to corresponding portions of a memory space of the data processing system, the system comprising:
a unique identifier generator configured to associate with each first instance protected pointer pointing to a newly allocated area in the memory space, a corresponding and unique allocation identifier;
a first validity verification mechanism that uses a valid identifications holding table for storing the respective unique allocation identifiers of validly still allocated respective ones of the allocated areas;
a protected pointers tracking mechanism that uses a pointers tracking table to keep track of addresses pointing to respective storage locations of protected pointers and to identifiably link the addresses pointing to the respective storage locations of the tracked protected pointers to the corresponding unique allocation identifiers of their respective allocated areas;
a multi-input associative cache configured to store searchable entries for at least a subset of the protected pointers, the searchable entries being searchable for by way of associative inputs into the cache including a first associative input for determining if an entry of a specific protected pointer is present in the cache and including a second associative input for identifying all entries of respective protected pointers that are identifiably linked to a given unique allocation identifier; and
a second validity verification mechanism that uses the multi-input associative cache to determine if an entry for a suspect pointer is present in the multi-input associative cache.

14. The system of claim 13 and further comprising:
a third validity verification mechanism, responsive to a miss determination by the second validity verification mechanism, the third validity verification mechanism being configured to check the pointers tracking table for presence therein of an entry for the suspect pointer and to also check the valid identifications holding table for presence therein of the unique allocation identifier to which the suspect pointer is identifiably linked within the pointers tracking table.

15. The system of claim 13 wherein:
the protected pointers tracking mechanism includes at least one of opcode hardware and opcode firmware configured to automatically store into the pointers tracking table each copy or derivative of each protected pointer used by application software of the system.

16. The system of claim 13 wherein:
the second validity verification mechanism includes at least one of opcode hardware and opcode firmware configured to automatically determine if an entry for a suspect pointer is present in the multi-input associative cache.

17. The system of claim 13 and further comprising:
a protected pointers invalidating mechanism configured to delete from the multi-input associative cache all pointer entries associated with a given unique allocation identifier and to delete from the valid identifications holding table, the given unique allocation identifier.

18. A data processing machine comprising:
one or more processors configured to execute a corresponding one or more applications, the processors being operative to invoke at least one of opcode hardware, opcode firmware and opcode microcode, wherein the invokable opcode comprises:
   first instance pointer giving opcode configured to cause a generator of the data processing machine to generate a corresponding and unique allocation identifier for logical association with a corresponding newly allocated area in a corresponding memory space of the data processing machine and to cause the generated unique allocation identifier to be logically associated with a corresponding first instance pointer pointing to the newly allocated area; and
   protected pointers tracking opcode configured to automatically add a protected pointers tracking entry into a protected pointers tracking table where the protected pointers tracking entry includes an address pointing to a respective storage location of a given pointer or of a copy thereof or of a derivative thereof, the protected pointer tracking entry also including an indicator of an association of the address pointing to the respective storage location with the corresponding and unique allocation identifier of the allocated area to which the pointer points.

19. The data processing machine of claim 18 wherein the invokable opcode further comprises:
   cache checking opcode configured to automatically check for presence within a multi-input associative cache of the data processing machine of an entry corresponding to a suspect pointer.

* * * * *